US012609745B2

(12) United States Patent
Liu et al.

(10) Patent No.: US 12,609,745 B2
(45) Date of Patent: Apr. 21, 2026

(54) COMMUNICATION METHOD AND APPARATUS

(71) Applicant: HUAWEI TECHNOLOGIES CO., LTD., Shenzhen (CN)

(72) Inventors: Chenchen Liu, Shenzhen (CN); Meihong Zhang, Shenzhen (CN); Wei Wang, Nanjing (CN); Shuyu Shi, Nanjing (CN); Xiao Han, Shenzhen (CN); Rui Du, Shenzhen (CN); Jian Yu, Shenzhen (CN); Yunbo Li, Shenzhen (CN); Yingxiang Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 436 days.

(21) Appl. No.: 17/859,093

(22) Filed: Jul. 7, 2022

(65) Prior Publication Data

US 2022/0345188 A1     Oct. 27, 2022

Related U.S. Application Data

(63) Continuation of application No. PCT/CN2021/070718, filed on Jan. 7, 2021.

(30) Foreign Application Priority Data

Jan. 10, 2020     (CN) ........................ 202010028046.X

(51) Int. Cl.
| | |
|---|---|
| *H04B 7/06* | (2006.01) |
| *H04L 5/00* | (2006.01) |
| *H04W 24/10* | (2009.01) |

(52) U.S. Cl.
CPC ......... *H04B 7/0626* (2013.01); *H04L 5/0053* (2013.01); *H04W 24/10* (2013.01)

(58) Field of Classification Search
CPC ... H04B 7/0626; H04L 5/0053; H04L 5/0055; H04W 24/10; H04W 52/02;
(Continued)

(56) References Cited

U.S. PATENT DOCUMENTS

| | | | |
|---|---|---|---|
| 8,594,051 | B2 | 11/2013 | Breit et al. |
| 9,077,498 | B2 | 7/2015 | Abraham et al. |

(Continued)

FOREIGN PATENT DOCUMENTS

| | | |
|---|---|---|
| CN | 102598570 A | 7/2012 |
| CN | 102870342 A | 1/2013 |

(Continued)

OTHER PUBLICATIONS

IEEE: CSI-Profiles: Public Database for Wi-Fi Sensing—doc.: IEEE 802.11-19/2052r0; Authors: Dash et al. Assignee: Quantenna; Nov. 2019. (Year: 2019).*

(Continued)

*Primary Examiner* — Mohammed S Chowdhury
(74) *Attorney, Agent, or Firm* — Maier & Maier, PLLC

(57) ABSTRACT

A method includes: A first node sends a threshold and a first packet to a second node. Correspondingly, the second node receives the threshold and the first packet from the first node. Then, the second node determines first channel state information CSI based on the first packet. If a change amount of the first CSI relative to preset CSI exceeds the threshold, the second node sends a second packet to the first node. If the change amount of the first CSI relative to the preset CSI does not exceed the threshold, the second node does not need to send the second packet to the first node. The method is applied to a radio sensing process.

17 Claims, 27 Drawing Sheets

(58) Field of Classification Search
CPC ......... H04W 52/0261; H04W 74/0808; H04W 84/12; H04W 64/00; H04W 12/009; Y02D 30/70

See application file for complete search history.

(56) References Cited

U.S. PATENT DOCUMENTS

| | | | |
|---|---|---|---|
| 2012/0314611 A1 | 12/2012 | Baker et al. | |
| 2015/0063128 A1* | 3/2015 | Garikipati ............ | H04B 7/0452 |
| | | | 370/252 |
| 2016/0057785 A1 | 2/2016 | Zhang et al. | |
| 2016/0127019 A1* | 5/2016 | Schelstraete ........ | H04W 64/003 |
| | | | 370/252 |
| 2017/0033898 A1* | 2/2017 | Chun ................... | H04B 7/0417 |
| 2019/0041509 A1 | 2/2019 | Jiang et al. | |
| 2020/0305231 A1* | 9/2020 | Sadeghi ................ | H04W 12/30 |
| 2020/0400778 A1* | 12/2020 | da Silva ................ | H04W 8/005 |
| 2022/0302963 A1* | 9/2022 | Garcia Rodriguez ...................... | |
| | | | H04B 7/0617 |

FOREIGN PATENT DOCUMENTS

| | | |
|---|---|---|
| CN | 102882660 A | 1/2013 |
| CN | 105589506 A | 5/2016 |
| CN | 107431567 A | 12/2017 |
| CN | 107710803 A | 2/2018 |
| CN | 108271206 A | 7/2018 |
| CN | 108347741 A | 7/2018 |
| CN | 108347742 A | 7/2018 |
| CN | 110113818 A | 8/2019 |
| CN | 110446226 A | 11/2019 |
| EP | 1509011 A2 | 2/2005 |
| WO | 2012173535 A1 | 12/2012 |
| WO | 2017196252 A1 | 11/2017 |
| WO | 2018202942 A1 | 11/2018 |

OTHER PUBLICATIONS

U.S. Appl. No. 62/896,975, filed Sep. 6, 2019, provisional of US-20200400778 (Year: 2019).*

IEEE: CSI-based Wi-Fi Sensing: Results and Standardization Challenges—doc.: IEEE 802.11-19/1769; Authors: Dash et al. Assignee: Quantenna; Oct. 2019. (Year: 2019).*

IEEE Std 802.11ac-2013, IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHZ, Approved Dec. 11, 2013, 424 pages.

IEEE Std 802.11n-2009, IEEE Standard for Information technology—Telecommunications and information exchange between systems—Local and metropolitan area networks—Specific requirements, Part 11: Wireless LAN Medium Access Control (MAC) and Physical Layer (PHY) Specifications, Amendment 5: Enhancements for Higher Throughput, Approved Sep. 11, 2009, 535 pages.

IEEE P802.11ax/D6.0, Nov. 2019, Draft Standard for Information technology—Tele-communications and Information exchange between systems Local and metropolitan area networks—Specific requirements, Part 11: Wireless LAN Medium Access Control (MAC) and Physical Layer (PHY) Specifications, Amendment 1: Enhancements for High Efficiency WLAN, 780 pages.

\* cited by examiner

| Frame control field | Duration field | RA | TA | Sounding dialog token field | Station information field 1 | ... | Station information field n | STA Info SAC | FCS |
|---|---|---|---|---|---|---|---|---|---|
| Byte: 2 | 2 | 6 | 6 | 1 | 4 | | 4 | 4 | 4 |

FIG. 11(a)

| Protocol version | Type | Subtype | To DS | From DS | More fragment | Try again | Power management | More data | Protected frame | Order |
|---|---|---|---|---|---|---|---|---|---|---|

FIG. 11(b)

| Ranging indication | HE/VHT | Sounding dialog token number |
|---|---|---|

Bit:    1              1              6

| AID | CSI feedback threshold | Reserved |
|---|---|---|

Bit:    11             n              21 – n

| AID | Disallowed subchannel bitmap | Reserved bit | Disambiguation flag bit | Reserved bit |
|---|---|---|---|---|

Bit:    11            8              8              1              4

| AID | Downlink number of space-time stream | Downlink number of repetition | Uplink number of space-time stream | Reserved bit | Disambiguation flag | Uplink number of repetition | Reserved bit |
|---|---|---|---|---|---|---|---|
| Offset | | | | | | | |

Bit: 11    6    3    3    3    1    1    3    1

FIG. 11(f)

| Frame control field | Duration field | RA | TA | Common information field | User information field | ... | User information field | Padding Field | Frame check sequence field |
|---|---|---|---|---|---|---|---|---|---|
| 2 | 2 | 6 | 6 | 8 or more | 5 or more | | 5 or more | variable | 4 |

Byte:

FIG. 12

COMMUNICATION METHOD AND APPARATUS

CROSS-REFERENCE TO RELATED APPLICATIONS

This application is a continuation of International Patent Application No. PCT/CN2021/070718, filed on Jan. 7, 2021, which claims priority to Chinese Patent Application No. 202010028046. X, filed on Jan. 10, 2020. The disclosures of the aforementioned applications are hereby incorporated by reference in their entireties.

STATEMENT OF JOINT RESEARCH AGREEMENT

The subject matter and the claimed invention were made by or on the behalf of Nanjing University and Huawei Technologies Co., Ltd., of Shenzhen, Guangdong Province, P. R. China, under a joint research agreement titled "Next Generation WiFi Sensing research project." The joint research agreement was in effect on or before the claimed invention was made, and that the claimed invention was made as a result of activities undertaken within the scope of the joint research agreement.

FIELD

This application relates to the field of communication technologies, a communication method, and an apparatus.

BACKGROUND

In a wireless communication process, movement of a to-be-detected object (for example, a human body) may interfere with a radio signal, and consequently a radio channel changes. Therefore, a wireless communication device may sense movement of a surrounding to-be-detected object based on a change in channel state information (CSI), to meet a radio sensing application requirement such as intrusion detection, elderly care, and indoor head counting. However, most existing CSI measurement technologies are designed for beamforming or ranging in the wireless communication process, and the radio sensing application requirement is not considered. In this way, when the existing CSI measurement technologies are used for radio sensing, because receive ends all need to send CSI obtained through measurement to transmit ends or receive ends all need to send a packet used to determine CSI to transmit ends, excessive transmission resources may be occupied.

SUMMARY

The embodiments provide a communication method and apparatus, to save transmission resources.

To achieve the foregoing objective, the embodiments use the following solutions.

According to a first aspect, an embodiment provides a communication method. The method includes: A second node receives a threshold and a first packet from a first node. Then, the second node determines first channel state information CSI based on the first packet. If a change amount of the first CSI relative to preset CSI exceeds the threshold, the second node sends a second packet to the first node.

If a to-be-detected object around the second node does not move or moves at a small amplitude, the change amount of the first CSI determined by the second node relative to the preset CSI does not exceed the threshold, and the second node does not need to feed back the second packet to the first node. When the second node does not feed back the second packet to the first node, the first node can learn that the to-be-detected object around the second node does not move or moves at a small amplitude. If the to-be-detected object around the second node moves or moves at a large amplitude, the change amount of the first CSI determined by the second node relative to the preset CSI exceeds the threshold, and the second node feeds back the second packet to the first node, to notify the first node in a timely manner that the to-be-detected object around the second node moves or moves at a large amplitude, thereby meeting a radio sensing application requirement. In most cases, most objects in an environment do not move, there are a small number of to-be-detected objects that move, and there is a high probability that the change amount of the first CSI relative to the preset CSI does not exceed the threshold. In other words, there are a high probability that the second node does not need to feed back the second packet to the first node, and a low probability of occupying a channel. This saves transmission resources, reduces interference to other normal data transmission, and reduces power consumption of the second node.

When a change amount of the first CSI relative to preset CSI exceeds the threshold, the second node sending a second packet to the first node may include: The second node receives a measurement query request from the first node. Then, in response to the measurement query request, if the change amount of the first CSI relative to the preset CSI exceeds the threshold, the second node sends an acknowledgment ACK message to the first node. After the second node receives a measurement trigger request from the first node, the second node sends the second packet to the first node. The ACK message indicates that the second packet is to be fed back to the first node. In other words, when the first node actively queries whether the second node needs to feed back the second packet, and the second node determines to feed back the second packet, the second node sends the second packet to the first node.

In this way, through the foregoing information exchange process between the first node and the second node, the second node can effectively send the second packet to the first node. Particularly, in a scenario in which one first node communicates with a plurality of second nodes, the first node queries, by using the measurement query request, whether the second node feeds back the second packet, and then sends the measurement trigger request to the second node that feeds back the second packet, so as to request the second node that feeds back the second packet to send the second packet to the first node. This avoids a case that a second node does not feed back the second packet and can further save transmission resources.

The measurement trigger request may further indicate a spatial flow for transmitting the second packet. That the second node sends the second packet to the first node includes: The second node sends the second packet to the first node by using the spatial flow indicated by the measurement trigger request. In this way, in a scenario in which one first node communicates with a plurality of second nodes, the second packet is transmitted in a spatial multiplexing manner. This greatly shortens time for obtaining the second packet by the first node and improves transmission efficiency.

the measurement trigger request may further indicate a subchannel for transmitting the second packet. That the second node sends the second packet to the first node includes: The second node sends the second packet to the first node through the subchannel indicated by the measurement trigger request. In this way, in a scenario in which one first node communicates with a plurality of second nodes, the second packet is transmitted in a frequency division multiplexing manner. This greatly shortens time for obtaining the second packet by the first node and improves transmission efficiency.

When a change amount of the first CSI relative to preset CSI exceeds the threshold, the second node sending a second packet to the first node may include: The second node receives first indication information from the first node. If the change amount of the first CSI relative to the preset CSI exceeds the threshold, the second node obtains a target channel based on the first indication information through channel contention. After the second node sends an NDPA to the first node through the target channel, the second node sends the second packet to the first node through the target channel. The NDPA indicates that the first node is to perform CSI measurement.

Because a radio sensing application is insensitive to message loss, even if a portion of information is lost within short time, a sounding effect of the radio sensing application is not affected, and the second node is allowed to obtain the target channel through channel contention. The second node contends for a channel only when the second node sends the second packet to the first node. Even if the second node fails to contend for the channel and does not feed back the NDPA to the first node in a timely manner, a sounding effect of radio sensing is not affected. The second node may obtain the target channel through channel contention again, and then feed back the second packet to the first node, so that the first node determines second CSI. When the second node does not need to send the second packet to the first node, the second node does not need to contend for the channel, to save transmission resources.

According to a second aspect, an embodiment may provide a communication method. The method includes: A second node receives a threshold and a first packet from a first node. Then, the second node determines first channel state information CSI based on the first packet. If a ranking order of a change amount of the first CSI relative to preset CSI in CSI change amounts stored in a preset time period is in a ranking range indicated by the threshold, the second node sends a second packet to the first node.

If a to-be-detected object around the second node does not move or moves at a small amplitude, the ranking order of the change amount of the first CSI determined by the second node relative to the preset CSI in the CSI change amounts stored in the preset time period exceeds the ranking range indicated by the threshold, and the second node does not need to feed back the second packet to the first node. When the second node does not feed back the second packet to the first node, the first node can learn that the to-be-detected object around the second node does not move or moves at a small amplitude. If the to-be-detected object around the second node moves or moves at a large amplitude, the ranking order of the change amount of the first CSI determined by the second node relative to the preset CSI in the CSI change amounts stored in the preset time period is in the ranking range indicated by the threshold, and the second node feeds back the second packet to the first node, to notify the first node in a timely manner that the to-be-detected object around the second node moves or moves at a large amplitude, thereby meeting a radio sensing application requirement. In most cases, most objects in an environment do not move, there are a small number of to-be-detected objects that move, and there is a high probability that the ranking order of the change amount of the first CSI relative to the preset CSI in the CSI change amounts stored in the preset time period exceeds the ranking range indicated by the threshold. In other words, there are a high probability that the second node does not need to feed back the second packet to the first node, and a low probability of occupying a channel This saves transmission resources, reduces interference to other normal data transmission, and reduces power consumption of the second node.

When a ranking order of a change amount of the first CSI relative to preset CSI in CSI change amounts stored in a preset time period is in a ranking range indicated by the threshold, the second node sending a second packet to the first node may include: The second node receives a measurement query request from the first node. In response to the measurement query request, if the ranking order of the change amount of the first CSI relative to the preset CSI in the CSI change amounts stored in the preset time period is in the ranking range indicated by the threshold, the second node sends an acknowledgment ACK message to the first node. The ACK message indicates that the second packet is to be fed back to the first node.

When a ranking order of a change amount of the first CSI relative to preset CSI in CSI change amounts stored in a preset time period is in a ranking range indicated by the threshold, the second node sending a second packet to the first node may include: The second node receives first indication information from the first node. If the ranking order of the change amount of the first CSI relative to the preset CSI in the CSI change amounts stored in the preset time period is in the ranking range indicated by the threshold, the second node obtains a target channel based on the first indication information through channel contention. After the second node sends an NDPA to the first node through the target channel, the second node sends the second packet to the first node through the target channel. The NDPA indicates that the first node is to perform CSI measurement.

In the first aspect or the second aspect, the communication method may further include: The second node receives second indication information from the first node. The second indication information indicates that the first CSI is used for radio sensing. In this way, the second node learns, based on the second indication information, that the first CSI is used for radio sensing instead of beamforming. After determining the first CSI, the second node may perform a corresponding processing step based on a radio sensing procedure specified in a protocol, for example, determining, based on a value relationship between the change amount of the first CSI and the threshold, whether to send the second packet to the first node.

In the first aspect or the second aspect, the second indication information may be carried in a null data packet announcement NDPA.

In the first aspect or the second aspect, the second indication information being carried in an NDPA may include: The second indication information is carried in a preset bit or a reserved bit of a target field of the NDPA.

In the first aspect or the second aspect, when the target field is a frame control field, the second indication information may be carried in the preset bit. The preset bit is a subtype bit. If the target field is a station information field, the second indication information is carried in the reserved bit. A sounding dialog token field of the NDPA indicates that the NDPA is not used for ranging, and a value of an associate identifier AID in the station information field is a preset value; or a sounding dialog token field of the NDPA indicates that the NDPA is used for ranging, and a value of an AID in the station information field is an identifier of the second node.

In the first aspect or the second aspect, the threshold may be carried in the NDPA or in a query frame.

In the first aspect or the second aspect, the threshold may be carried in some bits other than the AID in the station information field of the NDPA, and the value of the AID in the station information field may be the identifier of the second node. When the sounding dialog password field of the NDPA indicates that the NDPA is used for ranging, the threshold is carried in a user information field of the query frame.

In the first aspect or the second aspect, the first packet may be a null data packet NDP, a physical layer protocol data unit PPDU, or a data packet that carries a training symbol. The second packet may be an NDP, a PPDU, or a data packet that carries a training symbol.

According to a third aspect, an embodiment provides a communication method. The method includes: A first node sends a threshold and a first packet to a second node. Then, the first node receives a second packet from a third node. The first node determines second CSI based on the second packet. The threshold and the first packet are used to determine the third node, and the third node belongs to the second node.

The first node receiving a second packet from a third node may include: The first node sends a measurement query request to the second node. The first node receives an ACK message from the third node. The ACK message indicates that the second packet is to be fed back to the first node. After the first node sends a measurement trigger request to the third node, the first node receives the second packet from the third node.

The measurement trigger request may further indicate a spatial flow for transmitting the second packet. That the first node receives a second packet from a third node includes: The first node receives the second packet from the third node by using the spatial flow indicated by the measurement trigger request.

The measurement trigger request may further indicate a subchannel for transmitting the second packet. That the first node receives a second packet from a third node includes: The first node receives the second packet from the third node through the subchannel indicated by the measurement trigger request.

The communication method in this embodiment may further include: The first node determines a fourth node based on historical CSI of the second node and/or the ACK message of the third node; and after the first node sends the measurement trigger request to the fourth node, the first node receives the second packet from the fourth node.

The first node receiving a second packet from a third node may include: The first node sends first indication information to the second node. After the first node receives an NDPA from the third node through a target channel, the first node receives the second packet from the third node through the target channel. The NDPA indicates that the first node is to perform CSI measurement.

The communication method in this embodiment may further include: The first node sends second indication information to the second node. The second indication information indicates that first CSI determined based on the first packet is used for radio sensing.

The second indication information may be carried in the NDPA.

The second indication information being carried in the NDPA may include: The second indication information is carried in a preset bit or a reserved bit of a target field of the NDPA.

When the target field is a frame control field, the second indication information may be carried in the preset bit. The preset bit is a subtype bit. If the target field is a station information field, the second indication information is carried in the reserved bit. A sounding dialog token field of the NDPA indicates that the NDPA is not used for ranging, and a value of an AID in the station information field is a preset value; or a sounding dialog token field of the NDPA indicates that the NDPA is used for ranging, and a value of an AID in the station information field is an identifier of the second node.

The threshold may be carried in the NDPA or in a query frame.

The threshold may be carried in some bits other than the AID in the station information field of the NDPA, and the value of the AID in the station information field may be the identifier of the second node. When the sounding dialog password field of the NDPA indicates that the NDPA is used for ranging, the threshold is carried in a user information field of the query frame.

The first packet may be an NDP, a PPDU, or a data packet that carries a training symbol. The second packet may be an NDP, a PPDU, or a data packet that carries a training symbol.

According to a fourth aspect, an embodiment may provide a communication apparatus. The communication apparatus includes units configured to perform the steps in any one of the foregoing aspects. The communication apparatus may be the second node in the first aspect, or an apparatus including the second node; or the communication apparatus may be the second node in the second aspect, or an apparatus including the second node; or the communication apparatus may be the first node in the third aspect, or an apparatus including the first node.

According to a fifth aspect, an embodiment may provide a communication apparatus, including a processor and an interface circuit. The processor is configured to communicate with another apparatus through the interface circuit and perform the communication method provided in any one of the foregoing aspects. There are one or more processors. The communication apparatus may be the second node in the first aspect, or an apparatus including the second node; or the communication apparatus may be the second node in the second aspect, or an apparatus including the second node; or the communication apparatus may be the first node in the third aspect, or an apparatus including the first node.

According to a sixth aspect, an embodiment may provide a communication apparatus, including a processor. The processor is configured to connect to a memory, and invoke a program stored in the memory, to perform the communication method provided in any aspect. The memory may be located inside the communication apparatus or may be located outside the communication apparatus. There are one or more processors. The communication apparatus may be the second node in the first aspect, or an apparatus including the second node; or the communication apparatus may be the second node in the second aspect, or an apparatus including the second node; or the communication apparatus may be the first node in the third aspect, or an apparatus including the first node.

According to a seventh aspect, an embodiment may provide a communication apparatus, including at least one processor and at least one memory. The at least one processor is configured to perform the communication method provided in any one of the foregoing aspects. The communication apparatus may be the second node in the first aspect, or an apparatus including the second node; or the communication apparatus may be the second node in the second aspect, or an apparatus including the second node; or the communication apparatus may be the first node in the third aspect, or an apparatus including the first node.

According to an eighth aspect, an embodiment may provide a computer-readable storage medium. The computer-readable storage medium stores instructions. When the instructions are run on a computer, the computer is enabled to perform the communication method according to any one of the foregoing aspects.

According to a ninth aspect, an embodiment may provide a computer program product including instructions. When the computer program product is run on a computer, the computer is enabled to perform the communication method according to any one of the foregoing aspects.

According to a tenth aspect, an embodiment may provide a circuit system. The circuit system includes a processing circuit. The processing circuit is configured to perform the communication method according to any one of the foregoing aspects.

According to an eleventh aspect, an embodiment may provide a chip. The chip includes a processor. The processor is coupled to a memory. The memory stores program instructions. When the program instructions stored in the memory are executed by the processor, the communication method according to any one of the foregoing aspects is implemented.

According to a twelfth aspect, an embodiment may provide a communication system. The communication system includes the first node in any one of the foregoing aspects and the second node in any one of the foregoing aspects.

For effects brought by the second aspect to the twelfth aspect, refer to effects brought by the first aspect. Details are not described herein again.

BRIEF DESCRIPTION OF DRAWINGS

FIG. 11(a) is a schematic diagram of a frame structure according to an embodiment;

FIG. 11(b) is a schematic diagram of a structure of a frame control field according to an embodiment;

FIG. 11(f) is a schematic diagram of a structure of still another station information field according to an embodiment;

FIG. 12 is a schematic diagram of a structure of another frame control field according to an embodiment;

DESCRIPTION OF EMBODIMENTS

Figure 1:
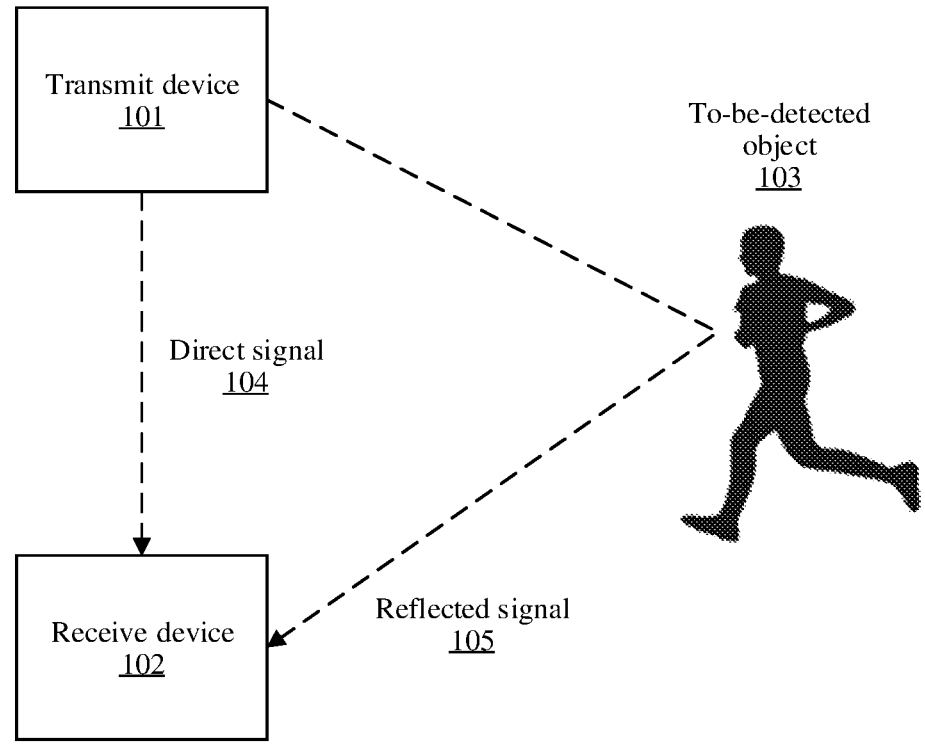
FIG. 1 is a schematic diagram of a principle of radio sensing according to a related technology.

In the specification and accompanying drawings, the terms "first", "second", and the like are intended to distinguish between different objects or to distinguish between different processing for a same object, but do not indicate a particular order of objects. In addition, the terms "include", "have", and any variant thereof mentioned in the descriptions are intended to cover a non-exclusive inclusion. For example, a process, a method, a system, a product, or a device that includes a series of steps or units is not limited to the listed steps or units, but optionally further includes other unlisted steps or units, or optionally further includes another inherent step or unit of the process, the method, the product, or the device. It should be noted that, in the embodiments, the word "example", "for example", or the like is used to represent giving an example, an illustration, or a description. Any embodiment described as an "example" or "for example" in the embodiments should not be explained as being more preferred or having more advantages than another embodiment. Use of words such as "example" or "for example" is intended to present a related concept.

Some concepts and processing procedures are first briefly described.

1. Beamforming

In a wireless communication process, if a transmit device has a plurality of antennas, the transmit device may adjust a phase and an amplitude of a transmit signal, so that a gain is increased when the antenna transmits a signal in some spatial directions. Similarly, if a receive device has a plurality of antennas, the receive device may also adjust a phase and an amplitude of a received signal, so that a gain is increased when the antenna receives a signal in some spatial directions.

2. Channel State Information (CSI)

The CSI is used to reflect a state of a current radio channel In a wireless fidelity (Wi-Fi) protocol, measurement is performed on each orthogonal frequency division multiplexing (OFDM) subcarrier group, to obtain a CSI matrix corresponding to the OFDM subcarrier group. A number of rows in the CSI matrix is a number of transmit antennas, and a number of columns in the CSI matrix is a number of receive antennas. Each element of the CSI matrix is a complex number including a real part and an imaginary part. Therefore, if there are a large number of antennas and subcarriers, for example, the number of subcarriers is 114, and a number of transmit antennas and a number of receive antennas are both 4. CSI of each subcarrier is a matrix, and both a number of rows and a number of columns of the matrix are 4. Each element in the matrix is a complex number. A real part and an imaginary part of the complex number are respectively represented by using 8 bits. In this way, if CSI on the 114 subcarriers is transmitted, 3648 bytes are used for transmission. Even if the CSI on the 114 subcarriers is processed by using a compression algorithm in the Institute of Electrical and Electronics Engineers (IEEE) 802.11ac, an amount of processed data is still thousands of bytes, and a large number of transmission resources are occupied.

3. Training Symbol

To enable a receive device to obtain CSI, a transmit device includes a special training symbol in a sent packet. In this way, the receive device determines the CSI based on the training symbol in the packet.

4. CSI Determining Process

In the CSI determining process, a transmit device sends a packet to a receive device. Correspondingly, the receive device receives the packet from the transmit device. A preamble part in the packet is a sequence known to both the transmit device and the receive device. After receiving the packet, the receive device extracts the preamble part from the packet and divides the received preamble part by the known sequence stored locally, to obtain a corresponding channel state, that is, CSI.

For example, the packet may be a data packet carrying a special training symbol or may be a null data packet (NDP), or may be a physical layer protocol data unit (PPDU).

5. Radio Passive Sensing

Radio passive sensing is a technology that uses a signal reflected by a radio wave on a to-be-detected object (such as a human body) to sense an action of the to-be-detected object.

Currently, various wireless communication devices have been widely applied to people's daily life. A wireless communication device may be a mobile phone, a computer, a wireless router, a smart home device, a wireless sensor, a wireless router, or the like. These wireless communication devices have features such as a large number, low prices, and being close to users. Generally, there are more than ten or even hundreds of wireless communication devices in a home environment of people. In a process in which these wireless communication devices perform wireless communication, a movement of the to-be-detected object (such as a human body) may interfere with a radio signal, and consequently a radio channel changes. Therefore, the wireless communication device may sense a movement of a surrounding to-be-detected object based on a change in the radio channel In terms of basic principles, a radio passive sensing technology uses a principle similar to "a human body radar" to sense a surrounding human body.

As shown in FIG. 1, a radio passive sensing system may include a transmit device 101 and a receive device 102. In an actual application process, there may be one or more transmit devices 101. There may be one or more receive devices 102. FIG. 1 shows only one transmit device and one receive device. The transmit device 101 and the receive device 102 may be separate physical devices or may be disposed in a same physical device. A radio signal received by the receive device 102 includes a direct signal 104 and a reflected signal 105 reflected by a to-be-detected object 103. When the to-be-detected object 103 moves, the reflected signal 105 also changes. Correspondingly, a superposed radio signal received by the receive device 102 also changes. In this case, the receive device 102 detects that a radio channel changes. Generally, in a communication protocol, a change in the radio channel is quantized and represented as a change in CSI and is represented as a change in an amplitude of the CSI and/or a change in a phase of the CSI. In other words, the receive device 102 senses, based on determined CSI, whether there is a to-be-detected object around or a movement state of the to-be-detected object. Therefore, the radio passive sensing technology may be widely applied to radio sensing applications such as intrusion detection, elderly care, gesture recognition, breathing and sleep monitoring, and indoor head counting.

Compared with a conventional sensing technology based on a wearable device such as a camera or a wristband, a radio passive sensing technology has the following advantages:

First, the radio passive sensing technology does not require any hardware costs. An existing wireless communication protocol, for example, Wi-Fi, supports presenting interference to a radio channel in a CSI manner.

Second, a user does not need to wear any device, and interference to the user is small. Therefore, the radio passive sensing technology can monitor the elderly and children and detect non-cooperative objects (such as intrusion thieves).

Third, the radio passive sensing technology has little impact on user privacy. Therefore, a wireless communication device that implements the radio passive sensing technology may be deployed in an area such as a bedroom or a bathroom.

Fourth, even in a poor lighting condition (for example, there are obstacles such as curtains and wooden furniture), the radio passive sensing technology can effectively perform sensing. The radio passive sensing technology can even perform multi-room sensing across walls.

Fifth, in terms of sensing precision, the radio passive sensing technology has very high sensing precision and can sense a weak movement such as breathing.

However, most existing CSI measurement technologies, for example, a CSI measurement technology in the IEEE 802.11, are designed for beamforming 0 or ranging in a wireless communication process, and a radio sensing application requirement is not considered. The existing CSI measurement technologies mainly include the following five types.

A first type is implicit feedback in IEEE 802.11n.

Figure 2:
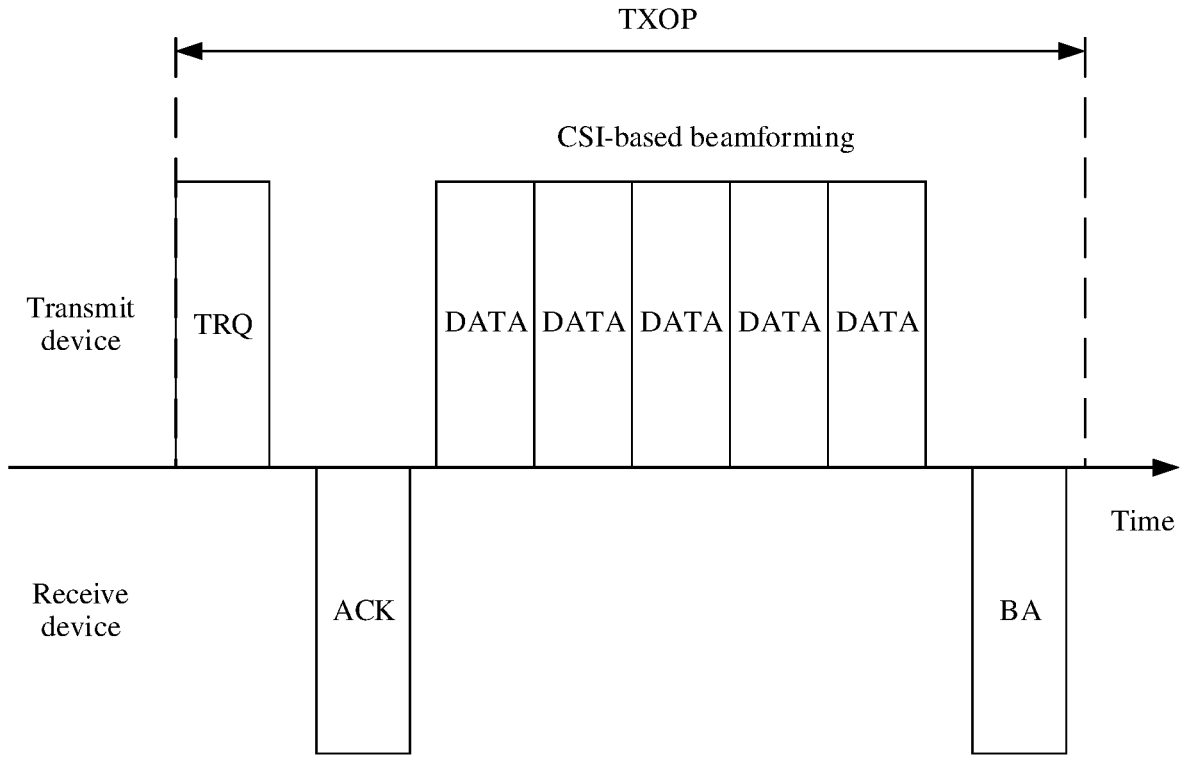
FIG. 2 is a schematic flowchart of a channel state information determining method according to a related technology.

In an implicit feedback method of the IEEE 802.11n, radio channel reciprocity is used. In a bidirectional communication process, channel measurement from a receive device to a transmit device may be equivalent to channel measurement from the transmit device to the receive device. As shown in FIG. 2, processing steps of the implicit feedback method of the IEEE 802.11n may include: After the transmit device obtains a transmit opportunity (TXOP), the transmit device sends a first packet to the receive device. Herein, the first packet carries a training request (TRQ). Correspondingly, the receive device receives the first packet from the transmit device. The receive device sends an acknowledgment (,ACK) message to the transmit device in response to the TRQ in the first packet. The ACK message includes a training symbol. Correspondingly, the transmit device receives the ACK message from the receive device. The transmit device determines CSI (namely, reverse CSI) of a radio channel from the receive device to the transmit device based on the training symbol in the ACK message. Then, CSI of a radio channel from the transmit device to the receive device is inferred based on the radio channel reciprocity and the reverse CSI, beamforming is performed based on the CSI of the radio channel from the transmit device to the receive device, and a beamforming parameter is determined. When the transmit device sends a packet to the receive device, beamforming may be performed by using the beamforming parameter. The transmit device transmits the packet to the receive device by using a beamformed beam. Correspondingly, the receive device receives the packet from the transmit device. A parameter part in the packet is to-be-transmitted data. After the receive device determines that the packet is successfully received, the receive device sends a batch acknowledgment (BA) message to the transmit device. Correspondingly, the transmit device receives the BA message from the receive device. In other words, the receive device does not feed back information of the CSI but feeds back the ACK message carrying the training symbol, so that the transmit device determines corresponding CSI.

To improve accuracy of the CSI, before the transmit device determines the CSI, the transmit device and the receive device first perform a calibration operation. An implementation process of the calibration operation is as follows: After the transmit device obtains a TXOP, the transmit device sends a TRQ to the receive device, to request the receive device to perform calibration. Then, the transmit device and the receive device send a packet that carries a training symbol to each other, so that the other party determines CSI based on the packet that carries the training symbol. Finally, the receive device feeds back the determined CSI to the transmit device. The transmit device compares the CSI fed back by the receive device and the CSI determined by the transmit device, to implement calibration and reduce a channel reciprocity deviation caused by a hardware factor. After calibration, a state of a channel from the transmit device to the receive device is inferred based on the CSI from the receive device to the transmit device. The receive device does not need to feed back information of the CSI to the transmit device, and the CSI can be determined within one TXOP.

However, the implicit feedback method of the IEEE 802.11n is closely combined with data transmission and is applicable to a scenario in which data is transmitted through a single link.

A second type is explicit feedback of the IEEE 802.11n.

In an explicit feedback method of the IEEE 802.11n, a receive device directly and explicitly feeds back CSI to a transmit device, and no calibration process is required.

Figure 3:
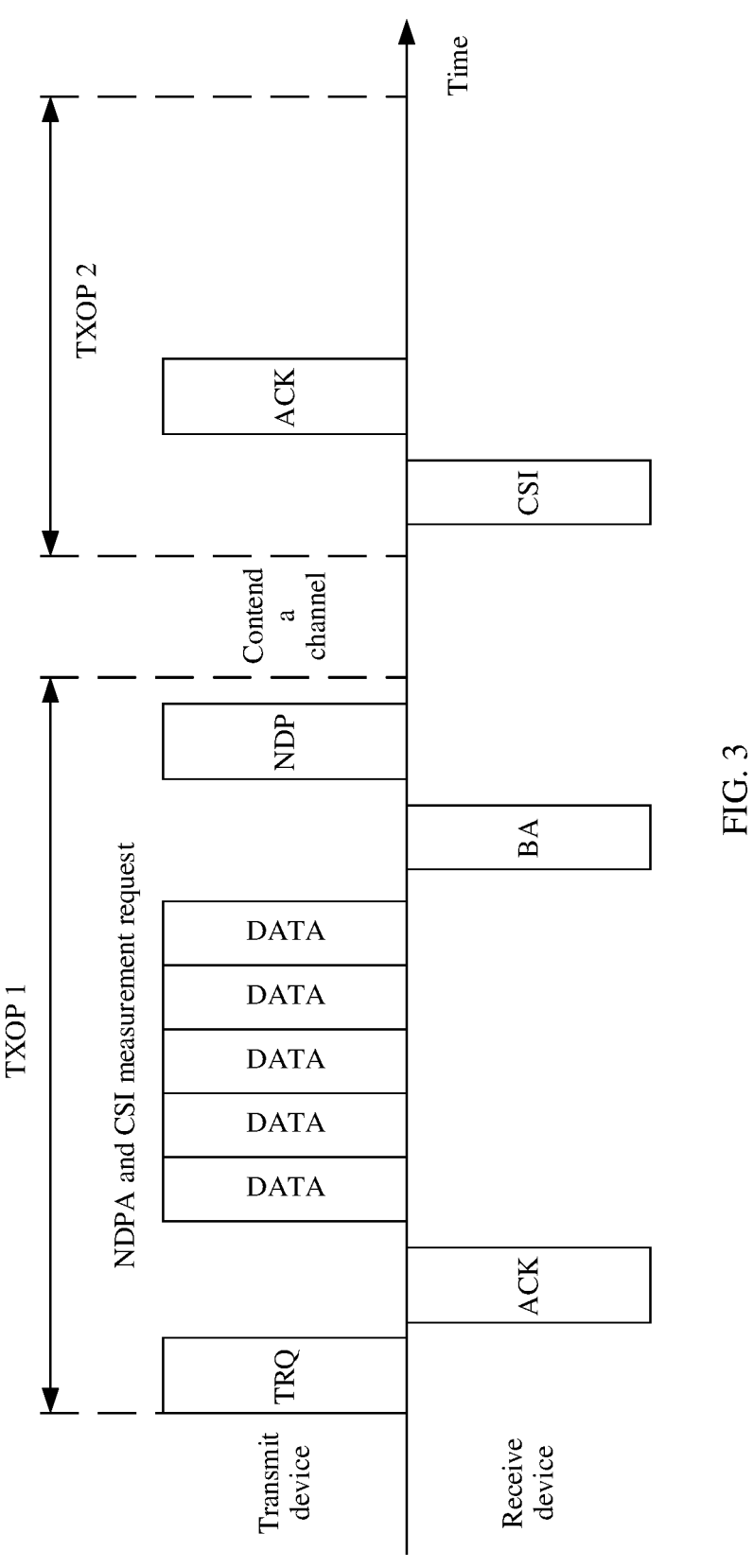
FIG. 3 is a schematic flowchart of another channel state information determining method according to a related technology.

As shown in FIG. 3, the processing steps of the explicit feedback method of the IEEE 802.11n may include: The transmit device obtains one TXOP, that is, a TXOP 1 in FIG. 3. In the TXOP 1, the transmit device sends a packet to the receive device. The packet includes a null data packet announcement (NDPA) and a CSI measurement request, to notify the receive device that CSI measurement is to be performed. Correspondingly, the receive device receives the packet from the transmit device. In the TXOP 1, the receive device sends a BA message to the transmit device, to notify the transmit device that the packet has been received. Correspondingly, the transmit device receives the BA message from the receive device. In the TXOP 1, the transmit device sends a null data packet (NDP) to the receive device. Correspondingly, the receive device receives the NDP from the transmit device. The one TXOP (that is, the TXOP 1) obtained by the transmit device ends. The receive device determines CSI based on the NDP, and obtains one TXOP, that is, a TXOP 2, through channel contention. In the TXOP 2, the receive device sends the CSI to the transmit device. Correspondingly, the transmit device receives the CSI from the receive device. In a next TXOP (for example, a TXOP after the TXOP 2) obtained by the transmit device, the transmit device performs beamforming processing based on the CSI. The CSI is carried in a CSI action frame, a non-compressed beamforming action frame, or a compressed beamforming action frame, and data of the CSI may be compressed data, or may be uncompressed data.

A third type is a multi-user multiple input multiple output (MU-MIMO) system in IEEE 802.11ac.

An IEEE 802.11ac MU-MIMO method supports a multi-user simultaneous transmission protocol, and a transmit device requests a plurality of receive devices to perform measurement at a same time. The transmit device may be an access point (AP).

Figure 4:
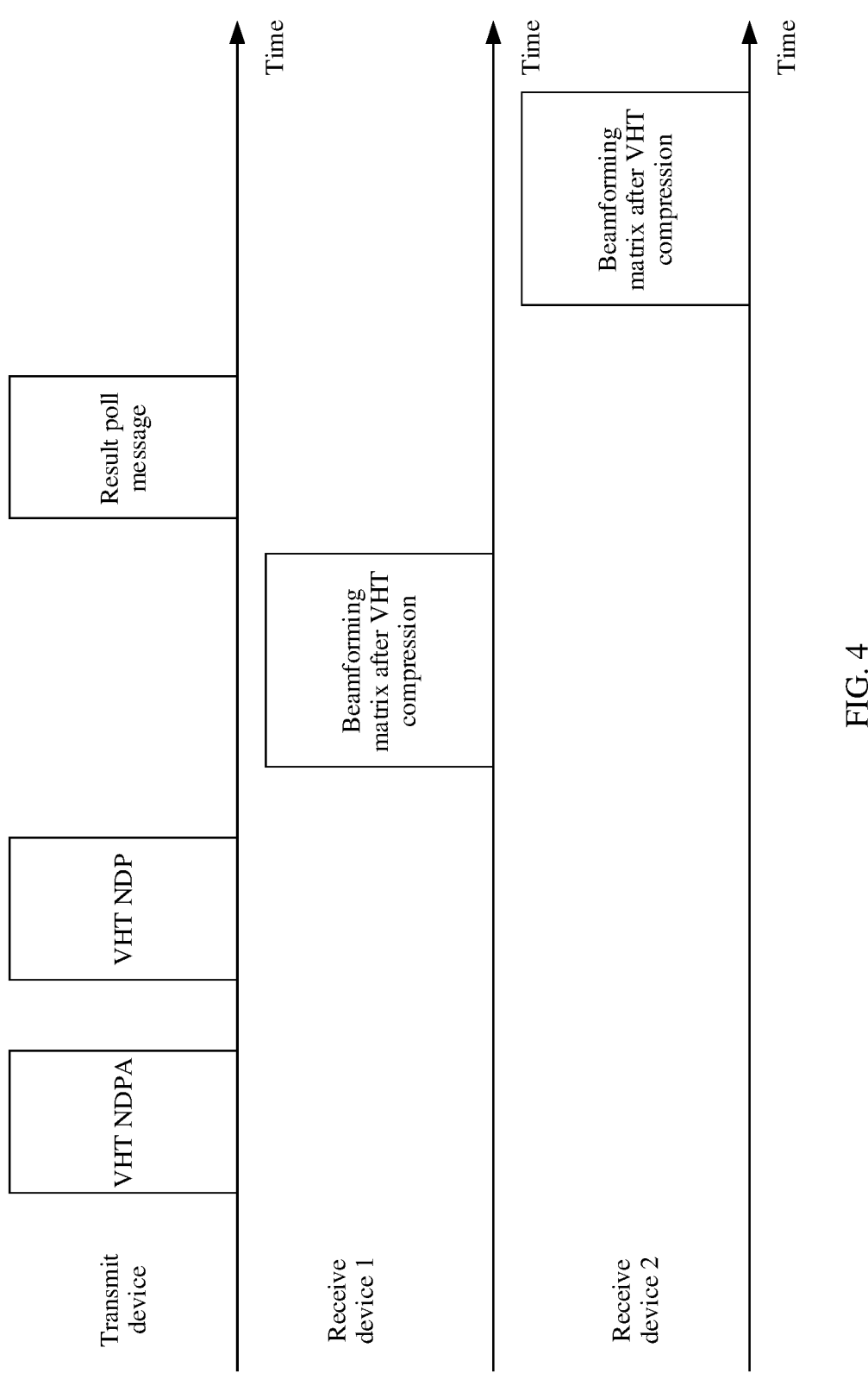
FIG. 4 is a schematic flowchart of still another channel state information determining method according to a related technology.

As shown in FIG. 4, the processing steps of the IEEE 802.11ac MU-MIMO method may include: The transmit device separately sends an NDPA in a very high throughput (VHT) format to the plurality of receive devices, to notify the plurality of receive devices that channel measurement is to be performed. Correspondingly, the plurality of receive devices separately receive the NDPA in the VHT format from the transmit device. Then, the transmit device separately sends an NDP in the VHT format to the plurality of receive devices. Correspondingly, the plurality of receive devices separately receive the NDP from the transmit device. The plurality of receive devices separately determine corresponding CSI based on the NDP. After determining the CSI, a first receive device feeds back the CSI to the transmit device based on a CSI format indicated by the NDPA. Then, the transmit device sequentially performs result polling processing and sends a result polling message to a receive device other than the first receive device in the plurality of receive devices, to request the corresponding receive device to feed back the CSI to the transmit device. Correspondingly, after receiving the result polling message, the receive device other than the first receive device in the plurality of receive devices feeds back the CSI to the transmit device. In the scenario shown in FIG. 4, only two receive devices are shown: a receive device 1 and a receive device 2. The receive device 1 is "the first receive device", and the receive device 2 is "the receive device other than the first receive device in the plurality of receive devices".

A fourth type is a ranging method in IEEE 802.11az.

Figure 5:
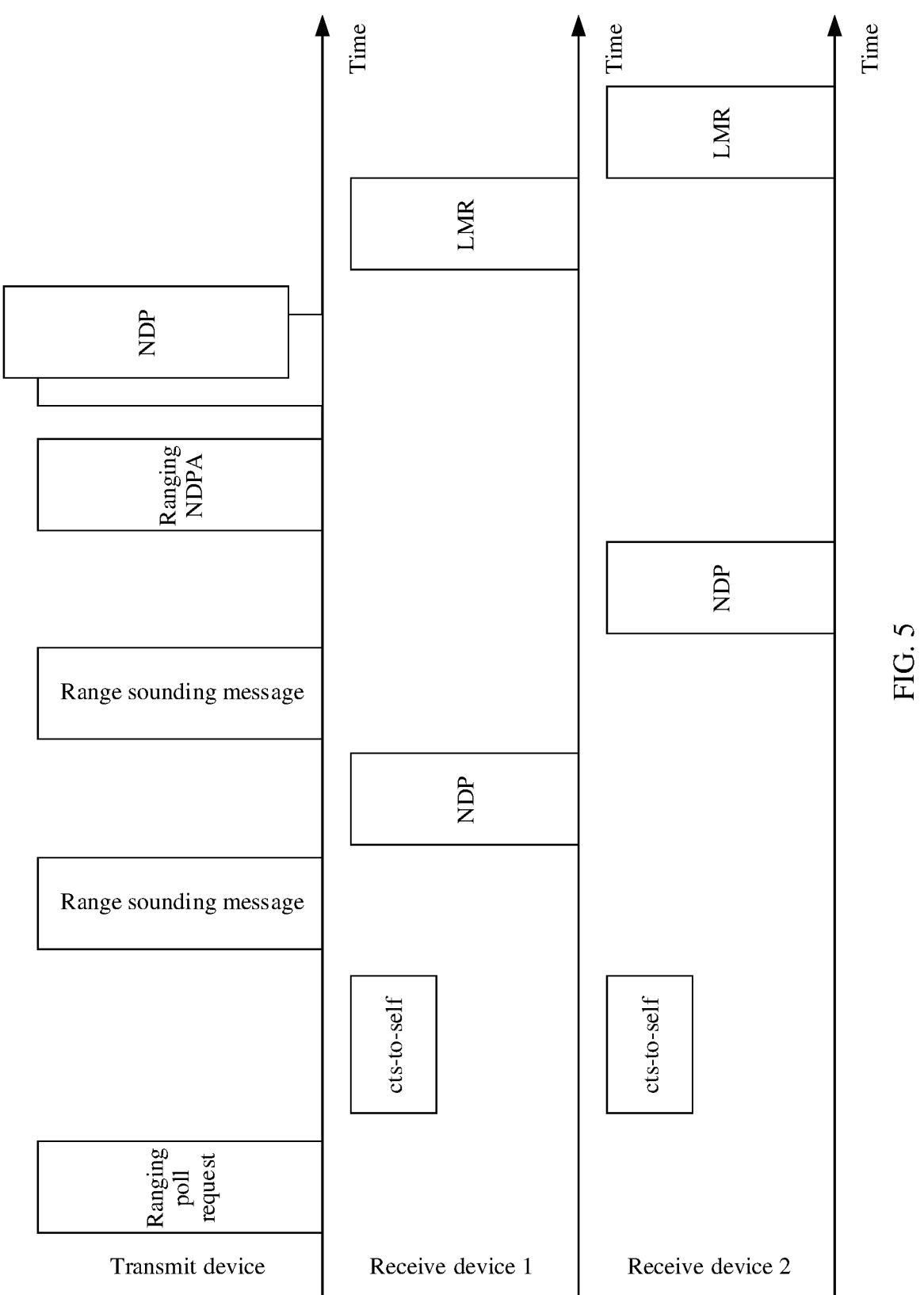
FIG. 5 is a schematic flowchart of yet another channel state information determining method according to a related technology.

In a distance measurement method of the IEEE 802.11az, CSI is used to perform ranging. As shown in FIG. 5, the processing steps of the ranging method of the IEEE 802.11az may include: A transmit device separately sends a ranging poll request to a plurality of receive devices, and correspondingly, the plurality of receive devices separately receive the ranging poll request from the transmit device. If the receive device determines to participate in ranging, the receive device sends a cts-to-self message to the transmit device, to notify the transmit device that the receive device participates in ranging. Then, the transmit device sequentially sends a range sounding message to the plurality of receive devices, to indicate a corresponding receive devices to feed back an NDP. Correspondingly, the receive device receives the range sounding message from the transmit device. Then, the receive device sends the NDP to the transmit device. Correspondingly, the transmit device receives the NDP from the receive device. The transmit device determines CSI based on the NDP. After the transmit device obtains CSI from the receive device to the transmit device, the transmit device sends an NDPA used for ranging to the receive device, to notify the receive device that CSI measurement is to be performed. Then, the transmit device sends the NDP to the receive device. Correspondingly, the receive device receives the NDP from the transmit device. The receive device determines the CSI based on the NDP. The receive device carries the CSI in a location measurement report (location measurement report, LMR), and feeds back the LMR to the transmit device. Correspondingly, the transmit device receives the LMR from the receive device. In this way, the transmit device can obtain CSI sent in an uplink direction and CSI sent in a downlink direction, and perform ranging based on the CSI in the two directions. In the scenario shown in FIG. 5, only two receive devices are shown: a receive device 1 and a receive device 2. The receive device 1 is "a first receive device", and the receive device 2 is "a receive device other than the first receive device in a plurality of receive devices".

A fifth type is to determine CSI by broadcasting an NDP.

Figure 6:
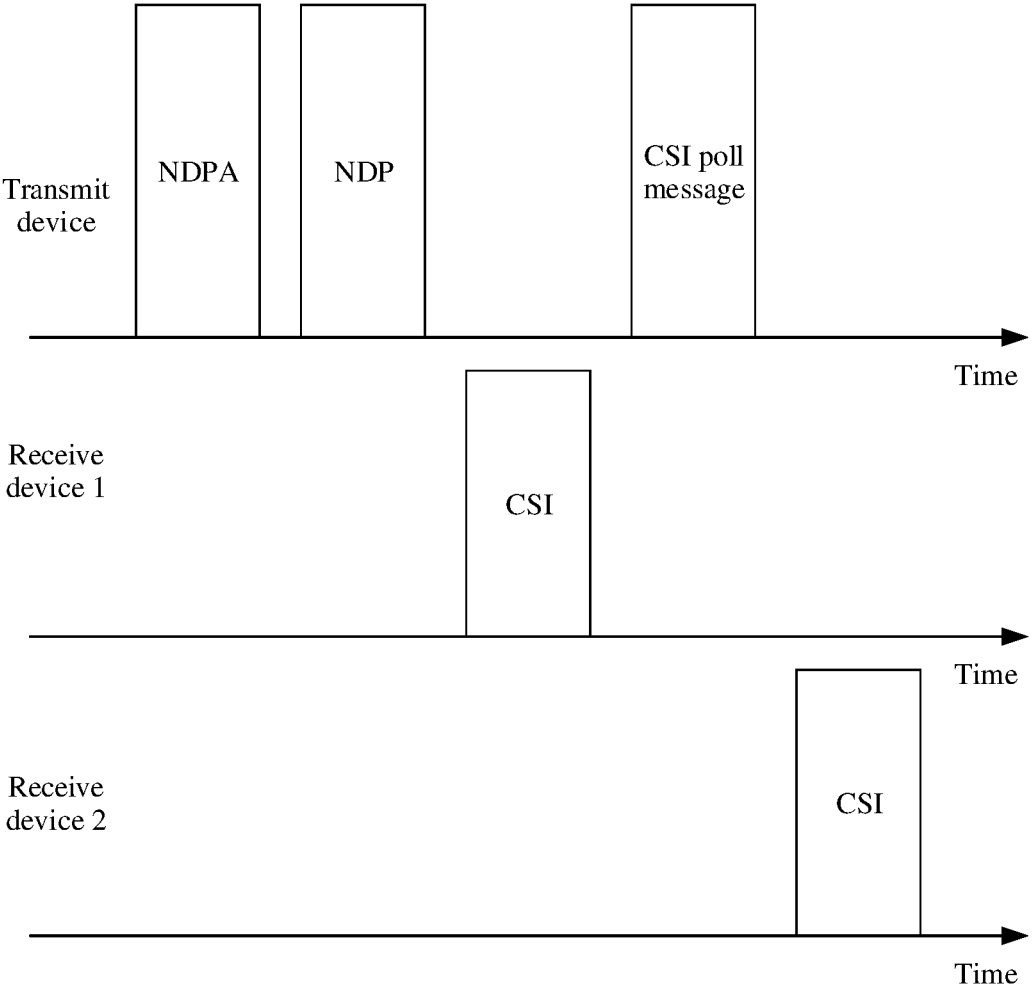
FIG. 6 is a schematic flowchart of still yet another channel state information determining method according to a related technology.

As shown in FIG. 6, processing steps of determining CSI by broadcasting an NDP may include: A transmit device separately sends an NDPA to a plurality of receive devices, and correspondingly, the receive device separately receive the NDPA from the transmit device. The NDPA indicates that the receive device is to perform CSI measurement. Then, the transmit device separately sends an NDP to the plurality of receive devices. Correspondingly, the receive devices separately receive the NDP from the transmit device. The receive device determines the CSI based on the NDP. In addition, the NDPA further indicates a first receive device to feed back the CSI. The first receive device sends the CSI to the transmit device in response to the NDPA. The first receive device may feed back some channel information to the transmit device, or may feed back, to the transmit device, information indicating that a channel does not change. Then, the transmit device sends a CSI poll message to receive devices other than the first receive device in the plurality of receive devices, to request the receive devices other than the first receive device in the plurality of receive devices to feed back the CSI. Correspondingly, the receive devices other than the first receive device in the plurality of receive devices separately receive the CSI poll message from the transmit device, and feed back the CSI to the transmit device based on the CSI poll message. In the scenario shown in FIG. 6, only two receive devices are shown: a receive device 1 and a receive device 2. The receive device 1 is "a first receive device", and the receive device 2 is "a receive device other than the first receive device in a plurality of receive devices".

In conclusion, most existing CSI measurement technologies are for beamforming or ranging, and receive devices feed back a message to a transmit device. However, in a radio sensing application scenario, most objects in an environment are static. If the receive devices feed back a message to the transmit device, excessive transmission resources may be occupied.

In view of this, the embodiments may provide a communication method. First, a communication system to which the communication method in the embodiments is applicable is described. The communication method provided in the embodiments may be applied to various communication systems, for example, a global system for mobile communication (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunication system (UMTS), worldwide interoperability for microwave access (WiMAX), a wireless local area network (WLAN) system, or a Wi-Fi system.

Figure 7:
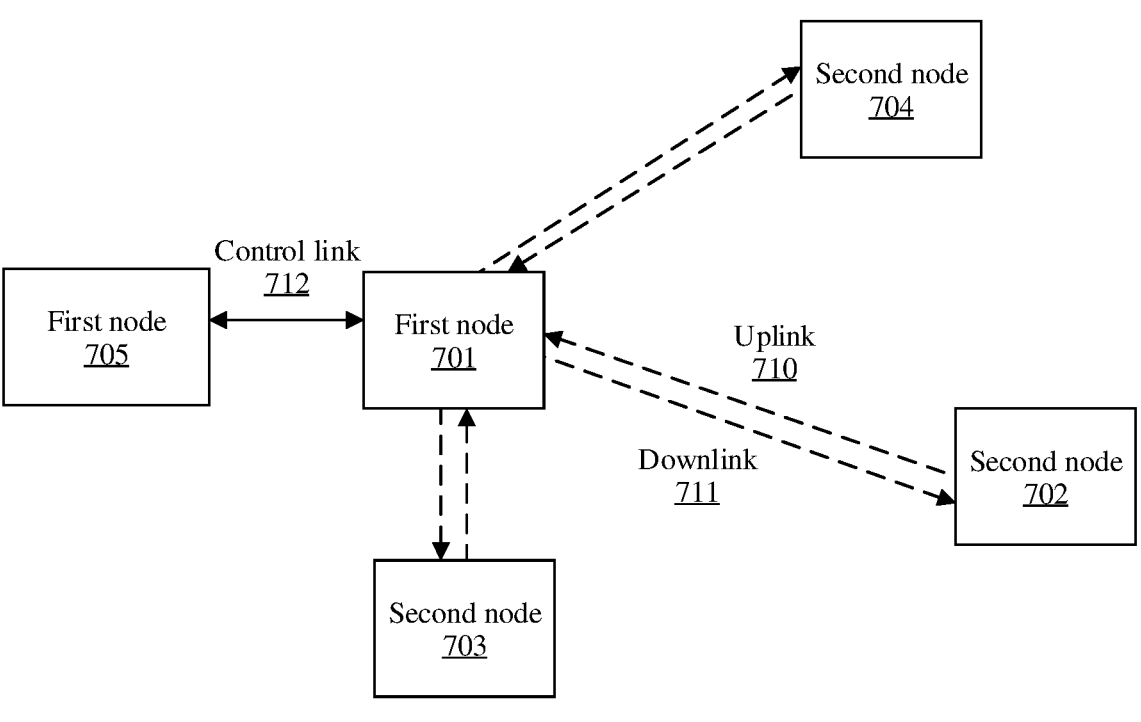
FIG. 7 is a diagram of an architecture of a communication system according to an embodiment.

The following uses the WLAN system as an example for description. As shown in FIG. 7, the Wi-Fi system may include a first node and a second node. The first node may be an AP, a terminal device such as a mobile phone, or a PDA. The second node may be a station (STA), or a terminal device such as a mobile phone, or a device that integrates a Wi-Fi function in a home or office environment such as a printer, a smart television, or a smart bulb. The first node may be configured to communicate with the second node by using a wireless local area network and transmit data of the second node to a network side or transmit data from a network side to the second node. There may be one or more first nodes. FIG. 7 shows only two first nodes, for example, a first node 701 and a first node 705. There may be one or more second nodes. FIG. 7 shows only three second nodes, for example, a second node 702, a second node 703, and a second node 704. A link through which the first node receives information of the second node is referred to as an uplink, for example, an uplink 710 shown by a dashed arrow in FIG. 7. A link through which the first node sends information to the second node is referred to as a downlink, for example, a downlink 711 shown by a dashed arrow in FIG. 7. A link between the first nodes is referred to as a control link, for example, a control link 712 shown by a solid-line bidirectional arrow in FIG. 7. The control link may be a wired connection or a wireless connection. Information is transmitted between the first nodes, to coordinate monitoring and meet a radio sensing application requirement. This embodiment focuses on a transmission process between the first node and the second node. In addition, the first node may also be described as a main control node, and the second node may also be described as a measurement node. It should be understood that the embodiments are described merely by using a Wi-Fi system as an example, but the embodiments are not limited thereto. The method and the apparatus in the embodiments may be further applied to another communication system. Similarly, only an AP and a STA in a Wi-Fi system are used as an example for description in the embodiments, but not limited thereto. The method and the apparatus in the embodiments may also be applied to a network device and a terminal device in another communication system.

For example, the application scenarios in the embodiments may include the following two typical scenarios.

Figure 8:
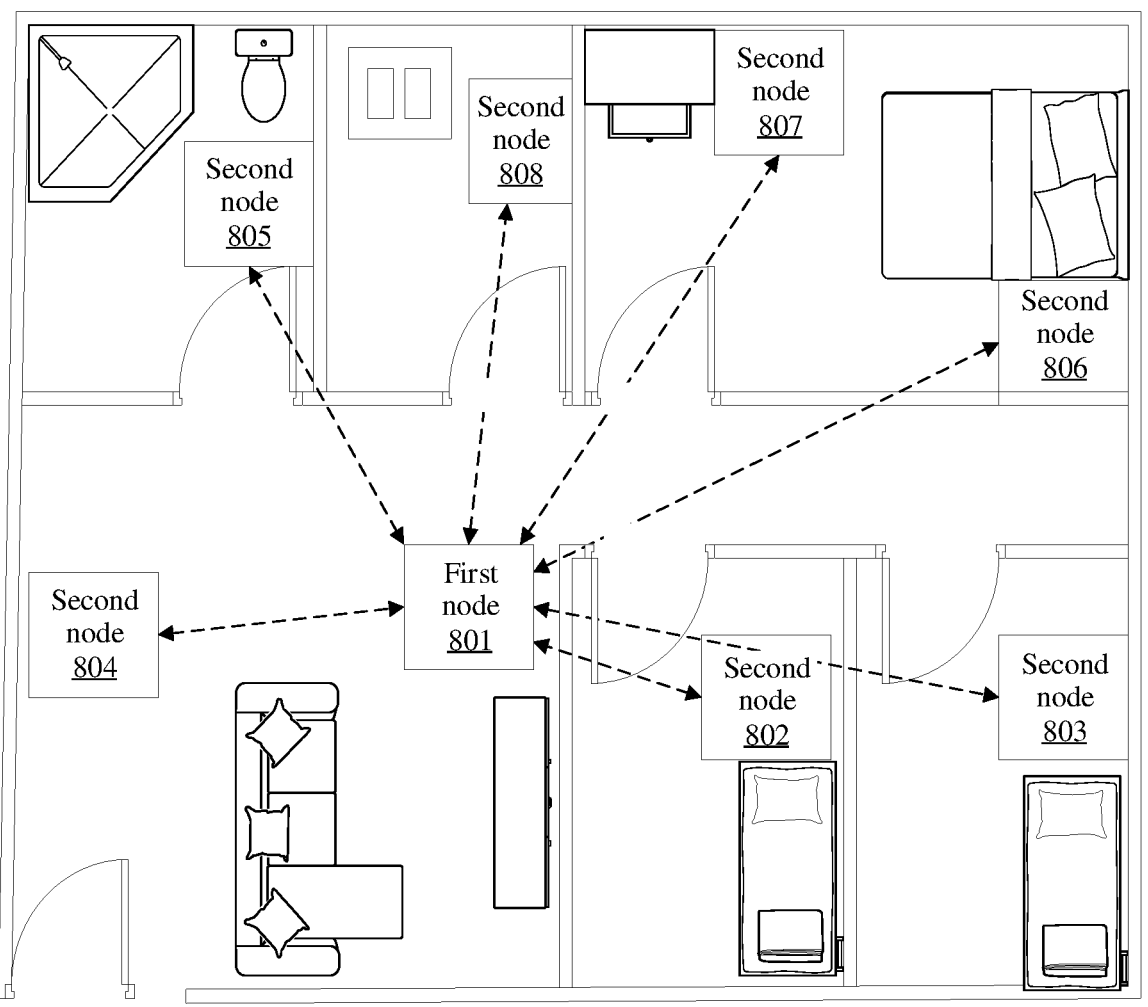
FIG. 8 is a schematic diagram of an application scenario according to an embodiment.

A first typical scenario is applied to a home environment. As shown in FIG. 8, in the home environment, there may be one first node, and the first node is disposed in a living room. There may be a plurality of second nodes, which are respectively deployed in a bedroom, a bathroom, and the like. The first node and the second node monitor the entire home environment. A dashed line with an arrow in FIG. 8 represents a link between the first node and a second node. In the scenario shown in FIG. 8, a first node 801 exchanges information with a second node 802, a second node 803, and a second node 806 in the bedroom separately, to monitor a sleep state of a user. The first node 801 exchanges information with a second node 804 in the bedroom, to monitor a condition of the living room. The first node 801 exchanges information with a second node 805 in the bathroom to monitor a condition of the bathroom. After a human body slip action is detected, the first node 801 may send an alarm to a device of a medical institution, to indicate medical personnel to perform rescue in a timely manner. The first node 801 exchanges information with a second node 807 in the bedroom, to monitor a condition of the bedroom. The first node 801 exchanges information with a second node 808 in a kitchen, to monitor a condition of the kitchen.

A second typical scenario is applied to a to-be-monitored area specified in an industrial environment or applied to a to-be-monitored area specified in a scenario of a commercial environment.

Figure 9:
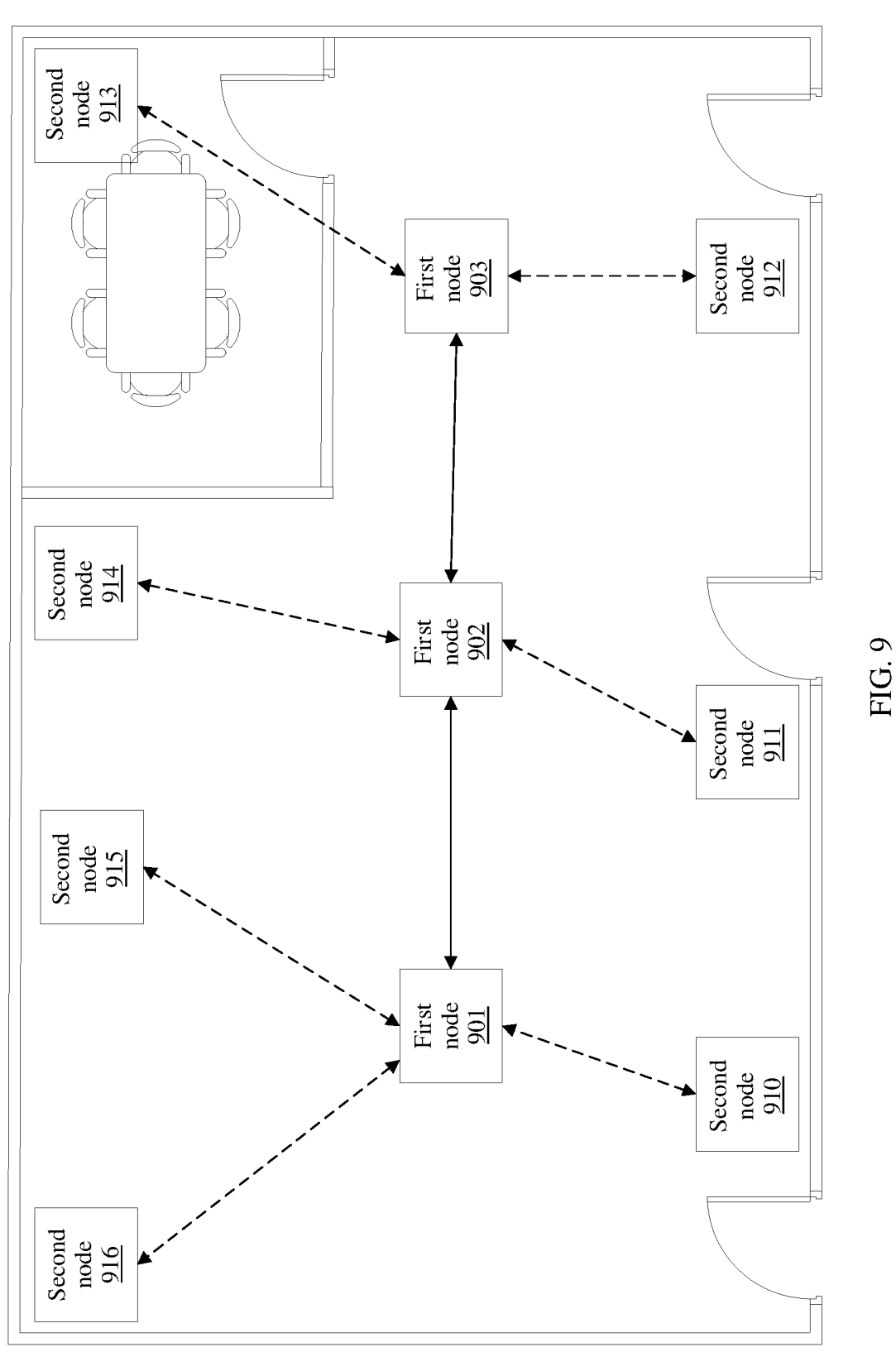
FIG. 9 is a schematic diagram of another application scenario according to an embodiment.

As shown in FIG. 9, when an area of a to-be-monitored area is large, there may be a plurality of first nodes. In the scenario shown in FIG. 9, three first nodes are disposed: a first node 901, a first node 902, and a first node 903, and the three first nodes are disposed in a central area of the to-be-monitored area. A solid-line with a double-headed arrow between two first nodes is used to represent a link between the two first nodes. There may also be a plurality of second nodes: a second node 910, a second node 911, a second node 912, a second node 913, a second node 914, a second node 915, and a second node 916. The second node 910, the second node 911, and the second node 912 are disposed in an area near an entrance and an exit of the to-be-monitored area. The second node 913 is disposed in a conference room. The second node 914, the second node 915, and the second node 916 are disposed in an edge area of the to-be-monitored area. A dashed line with a bidirectional arrow between one first node and one second node is used to represent a link between the first node and the second node. For example, in the scenario shown in FIG. 9, the first node 901 exchanges information with the second node 910, to monitor an entrance/exit condition at the entrance/exit of the to-be-monitored area. The first node 903 exchanges information with the second node 913, to collect statistics on occupation of the conference room and/or a number of persons in the conference room.

The communication system and a service scenario that are described in embodiments are intended to describe the embodiments more clearly, and do not constitute a limitation on the embodiments.

The following describes in detail the communication method provided in the embodiments.

Figure 10:
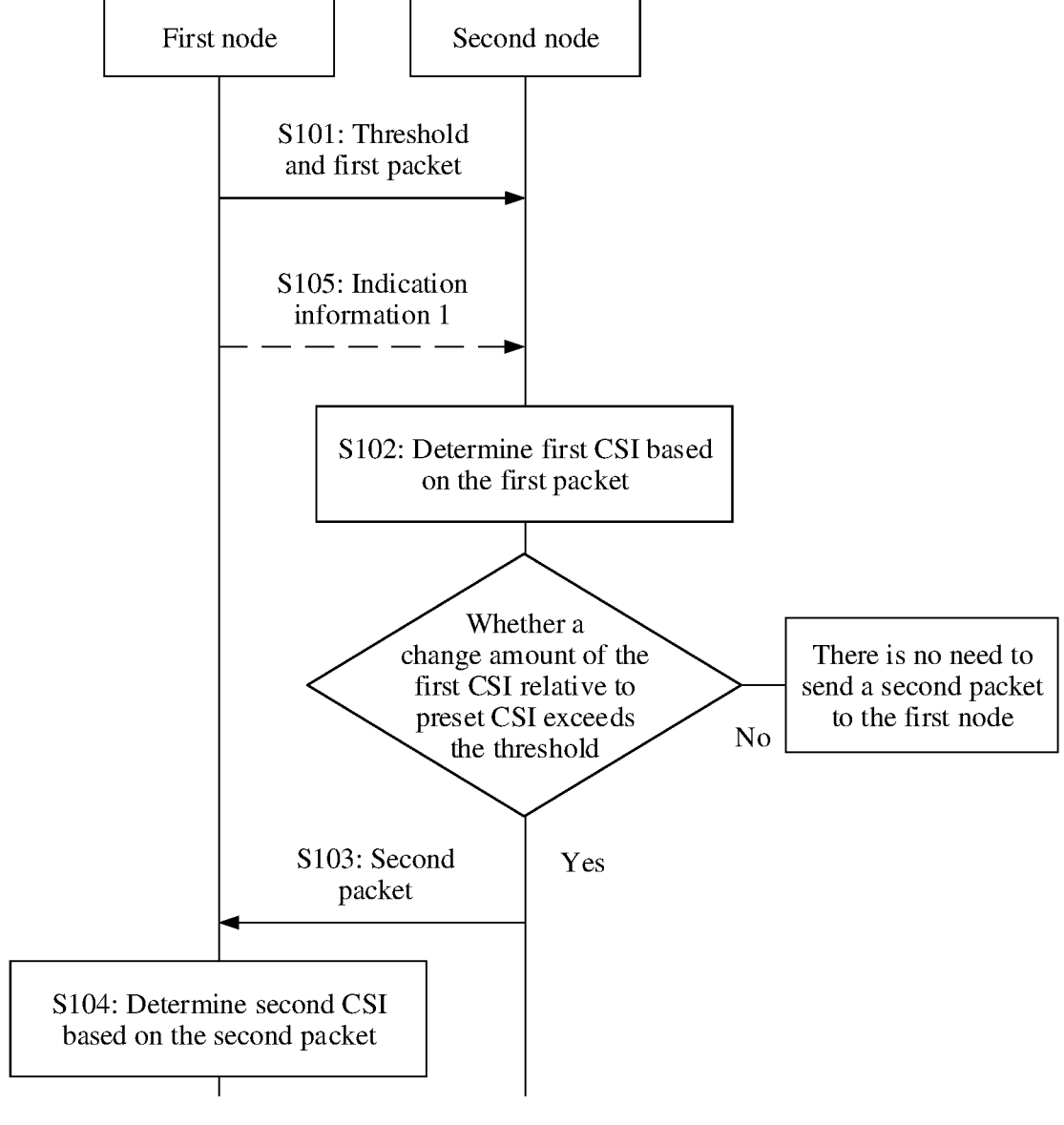
FIG. 10 is a schematic flowchart of a communication method according to an embodiment.

An embodiment provides a communication method, and the communication method is applied to a radio sensing process, as shown in FIG. 10. The communication method includes the following steps.

S101: A first node sends a threshold and a first packet to a second node. Correspondingly, the second node receives the threshold and the first packet from the first node.

A location for carrying the threshold may be, for example, but is not limited to, the following two types.

A first type is that the location for carrying the threshold is an NDPA.

For example, FIG. 11(a) shows a schematic diagram of an NDPA frame structure according to an embodiment. The NDPA frame includes a 2-byte frame control field, a 2-byte duration field, a 6-byte receive address (RA) field, a 6-byte transmit address (TA) field, a 1-byte sounding dialog token field, a 4-byte station information (STA Info) field corresponding to each of n stations, a 4-byte station information sequence authorization code (SAC) field, and a 4-byte frame check sequence (FCS) field.

Figure 11B:
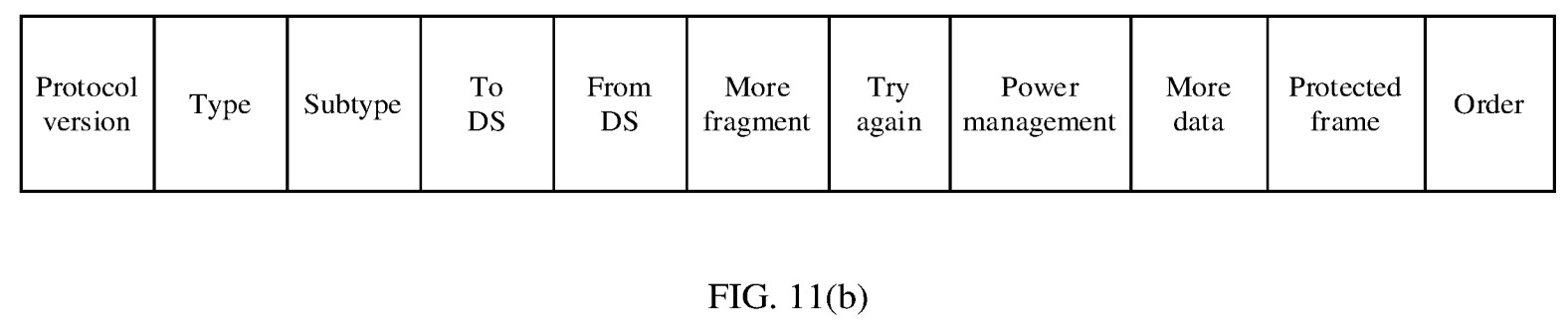

FIG. 11(b) shows a schematic diagram of a structure of a frame control field according to an embodiment. The frame control field may include a 2-bit protocol version) field, a 2-bit type field, a 4-bit subtype field, a 1-bit to distribution system (To DS) field, a 1-bit from distribution system (From DS) field, a 1-bit more fragment (More Frag-ments) field, a 1-bit retry field, a 1-bit power management field, a 1-bit more data field, a 1-bit protected frame, and a 1-bit order field.

Figures 11C, 11D, 11E:
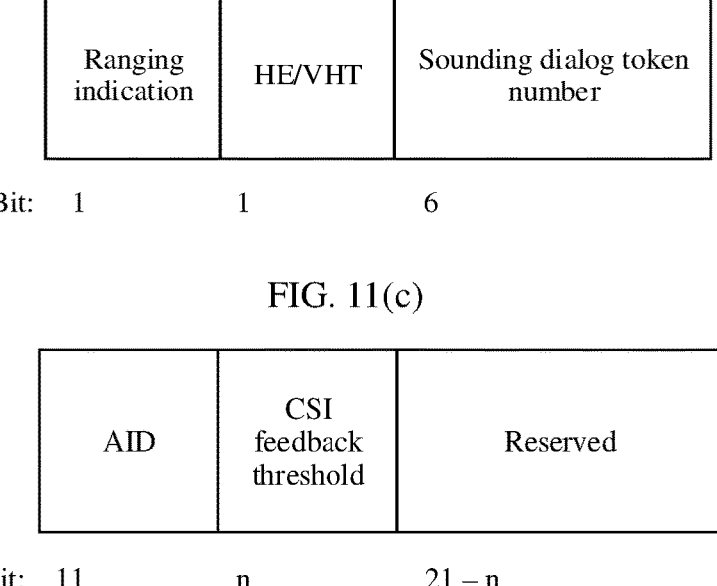
FIG. 11(c) is a schematic diagram of a structure of a sounding dialog token field according to an embodiment.
FIG. 11(d) is a schematic diagram of a structure of a station information field according to an embodiment.
FIG. 11(e) is a schematic diagram of a structure of another station information field according to an embodiment.

FIG. 11(c) shows a schematic diagram of a structure of a sounding dialog token field according to an embodiment. A 1-byte sounding dialog token field includes a 1-bit ranging indication bit, a 1-bit high efficient/very high throughput (HE/VHT) bit, and a 6-bit sounding dialog token number bit.

When the ranging indication bit of the sounding dialog token field indicates that the NDPA is not used for ranging, FIG. 11(d) shows a schematic diagram of a structure of a station information field according to an embodiment. A 4-byte station information field includes an 11-bit associate identifier (AID) field, an n-bit CSI feedback threshold field, and a (21−n)-bit reserved bit. The AID field is used to carry an identifier of the second node. All bits other than the AID in the station information field can carry the threshold. n is a positive integer greater than or equal to 0.

When the ranging indication bit of the sounding dialog token field indicates that the NDPA is not used for ranging, FIG. 11(e) shows a schematic diagram of another structure of a station information field according to an embodiment. A 4-byte station information field includes an 11-bit AID field, an 8-bit disallowed subchannel bitmap field, an 8-bit reserved bit, a 1-bit disambiguation flag bit, and a 4-bit reserved bit. A value indicated by the AID field is 2047. When the value indicated by the AID field is 2047, the AID field indicates that the station information field in which the AID is located has a special meaning.

When the ranging indication bit of the sounding dialog token field indicates that the NDPA is used for ranging, FIG. 11(f) shows a schematic diagram of still another structure of a station information field according to an embodiment. A 4-byte station information field includes an 11-bit AID field, a 6-bit offset, a 3-bit downlink number of spatial-time stream (DLN-STS), a 3-bit downlink number of repetition (DLN-Rep), a 3-bit uplink number of spatial-time stream (ULN-STS), a 1-bit reserved bit, a 1-bit disambiguation flag bit, a 3-bit uplink number of repetition (ULN-Rep), and a 1-bit reserved bit. The AID field is used to carry the identifier of the second node. Herein, the identifier of the second node may be an associate identifier (AID), a sensing identifier (SID), or a radio identifier (RID).

A second type is that the location for carrying the threshold is an inquiry frame.

For example, FIG. 12 shows a schematic diagram of a frame structure of query frame according to an embodiment. The query frame includes a frame header, a data part, and a frame trailer. The frame header and the frame trailer are not shown in FIG. 12. The data part includes a packet. Fields in the packet are shown in FIG. 12, a 2-byte frame control field, a 2-byte duration field, a 6-byte RA field, a 6-byte TA field, a 1-byte sounding dialog token field, a 1-byte common information field, a 5-byte user information (User Info) field corresponding to each of n stations, a variable padding field, and a 4-byte frame check sequence field. The user information field may be five bytes or more bytes. The user information field is used to carry the threshold.

Herein, when the ranging indication bit of the sounding dialog token field indicates that the NDPA is used for ranging, the station information field of the NDPA does not have more bits to carry the threshold, and the user information field of the query frame may be used to carry the threshold.

It should be noted that the location for carrying the threshold may alternatively be the first packet, that is, the first packet includes the threshold. In this case, the first node sends the first packet to the second node. Correspondingly, the second node receives the first packet from the first node. In this way, the second node can obtain the first packet used to determine first CSI and the threshold used to determine whether to send a second packet to the first node.

The first packet may be an NDP, may be a PPDU, or may be a data packet that carries a training symbol.

For example, in one TXOP obtained by the first node, the first node first sends the NDPA carrying the threshold to the second node, and then sends an NDP to the second node.

S102: The second node determines the first CSI based on the first packet.

The first CSI indicates a state of a channel from the first node to the second node. When the first node is a main control node (for example, an AP) and the second node is a measurement node (for example, a STA), the first CSI indicates a channel condition of a downlink.

For example, the second node determines the first CSI based on a preamble part of the first packet and a locally stored known sequence.

S103: If a change amount of the first CSI relative to preset CSI exceeds the threshold, the second node sends the second packet to the first node. Correspondingly, the first node receives the second packet from the second node.

The preset CSI may be first CSI previous to the first CSI currently determined by the second node. Alternatively, the preset CSI may be CSI corresponding to a token indicated by the first node.

The threshold may be an amplitude threshold or a phase threshold.

When the threshold is the amplitude threshold, a unit of the amplitude threshold is dB. Precision of the amplitude threshold is 0.1 dB. A value of the amplitude threshold is obtained through statistical calculation based on an amplitude change rule of the second node. For example, in a sensing preparation phase, a variance of amplitudes of the CSI is collected based on the amplitudes of the CSI determined through a plurality of times of measurement in a static environment. The amplitude threshold is set to three times the variance to achieve a 0.27% false positive rate in a Gaussian noise environment. For another example, the first node increases the amplitude threshold based on a service requirement, to reduce a number of times that the second node sends the second packet. Alternatively, the first node decreases the amplitude threshold based on a service requirement, to increase a number of times that the second node sends the second packet.

When the threshold is the phase threshold, a unit of the phase threshold is a radian. A value of the phase threshold may be obtained through statistical calculation based on a phase change rule of the second node or may be set by the first node based on a service requirement.

In addition, the value of the threshold may be zero or a negative number, so that the second node always feeds back the second packet to the first node. Alternatively, the value of the threshold may be another value, so that the second node does not need to feed back the second packet to the first node.

The second packet may be an NDP, a PPDU, or a data packet that carries a training symbol.

S104: The first node determines second CSI based on the second packet.

The second CSI indicates a state of a channel from the second node to the first node. When the first node is the main control node (for example, the AP) and the second node is the measurement node (for example, the STA), the second CSI indicates a channel condition of an uplink.

Herein, for an implementation step of S104, refer to the detailed description of S103. Details are not described herein again.

After the first node determines the second CSI, the second CSI is stored. The first node processes the second CSI to determine whether a to-be-detected object moves. The first node may also determine, based on the second CSI, whether the second node is incorrectly triggered, or the first node determines whether redundancy exists between the second CSI of the second node and second CSI of another second node. If the first node determines to suppress the second node from feeding back the second packet, the first node increases a threshold of the second node, to reduce sensitivity of the second node. In this way, the threshold in this embodiment dynamically changes, so that the first node flexibly controls frequency and accuracy of feeding back the second packet by the second node.

It should be noted that in all the foregoing processes, "one first node and one second node" are used as an example to describe an implementation process of the communication method in this embodiment. In an actual application process, one first node communicates with a plurality of second nodes, or a plurality of first nodes communicate with a plurality of second nodes, to implement radio sensing. In a scenario in which "one first node communicates with a plurality of second nodes" or a scenario in which "a plurality of first nodes communicate with a plurality of second nodes", for a process of communication between one first node and one second node, refer to related descriptions of S101 to S104. Details are not described herein again. In addition, the first node may send the threshold and the first packet to one or more second nodes by broadcasting. This helps shorten a time of information transmission between the first node and the second node. When there is a plurality of second nodes, this also helps monitor an environment condition in a large area. In addition, when there is a plurality of second nodes, a second node that feeds back the second packet to the first node may also be described as a "third node". The third node belongs to a part of nodes in the second nodes.

According to the communication method provided in this embodiment, after the second node determines the first CSI, the second node determines, based on a value relationship between the change amount of the first CSI relative to the preset CSI and the threshold, whether to feed back the second packet to the first node. In the conventional technology, after receiving the first packet from the first node, the second node feeds back CSI or a packet used to determine the CSI to the first node. However, in the communication method provided in this embodiment, a change of a radio channel from the first node to the second node is consistent with a change of a radio channel from the second node to the first node. If the to-be-detected object around the second node does not move or moves at a small amplitude, the change amount of the first CSI determined by the second node relative to the preset CSI is less than or equal to the threshold, the second node determines that a change amount of CSI from the second node to the first node is also less than or equal to the threshold, and the second node does not need to feed back the second packet to the first node. In most cases, a to-be-monitored environment is quiet, and a probability that the change amount of the first CSI relative to the preset CSI is less than or equal to the threshold is large. In other words, a probability that the second node does not need to feed back the second packet to the first node is large, and a channel does not need to be occupied. Therefore, transmission resources are saved, interference to other normal Wi-Fi data transmission is reduced, and power consumption of the second node is reduced. If the to-be-detected object around the second node moves or moves at a large amplitude, the change amount of the first CSI determined by the second node relative to the preset CSI is greater than the threshold, and the second node feeds back the second packet to the first node, to notify the first node in a timely manner that the to-be-detected object in a to-be-monitored area moves. The second node feeds back the second packet instead of information of the CSI to the first node. Compared with the information of the CSI, the second packet has fewer bytes, so that transmission resources can be further saved. In addition, according to the communication method provided in this embodiment, a movement condition of the to-be-detected object in the environment can be sensed without accurate calibration.

In some embodiments, according to the communication method in this embodiment, indication information 1 can be further transmitted to the second node. In this embodiment, the indication information 1 may also be described as "second indication information". As shown in FIG. 10, the communication method in this embodiment of this application may further include S105.

S105: The first node sends the indication information 1 to the second node. Correspondingly, the second node receives the indication information 1 from the first node.

The indication information 1 indicates that the first CSI is used for radio sensing.

The indication information 1 is carried in the NDPA. The indication information 1 may be carried in a preset bit or a reserved bit of a target field of the NDPA.

As shown in FIG. 11(b), when the target field is a frame control field, the indication information 1 may be carried in the preset bit. The preset bit is a subtype bit. When a value of the preset bit is a preset value, it is indicated that the first CSI is used for radio sensing.

As shown in FIG. 11(e), when the target field is a station information field, the indication information 1 may be carried in the reserved bit. The sounding dialog token field of the NDPA indicates that the NDPA is not used for ranging, and a value of an associate identifier AID in the station information field is a preset value, that is, 2047.

As shown in FIG. 11(f), when the target field is a station information field, the indication information 1 may be carried in the reserved bit. The sounding dialog token field of the NDPA indicates that the NDPA is used for ranging, and a value of an AID in the station information field is the identifier of the second node.

In this way, the first node transmits the indication information 1 to the second node, to indicate that the first CSI determined by the second node is used for radio sensing instead of beamforming. After determining the first CSI, the second node may perform a corresponding processing step based on a radio sensing procedure specified in a protocol, for example, determining, based on a value relationship between the change amount of the first CSI and the threshold, whether to send the second packet to the first node.

In some embodiments, for a scenario in which "one first node communicates with a plurality of second nodes", a process of S103 may be implemented in a plurality of manners, for example, but is not limited to the following two possible implementations.

In a first possible implementation, the first node actively queries whether the second node needs to feed back the second packet. When the second node determines to feed back the second packet, the second node sends the second packet to the first node.

Figure 13:
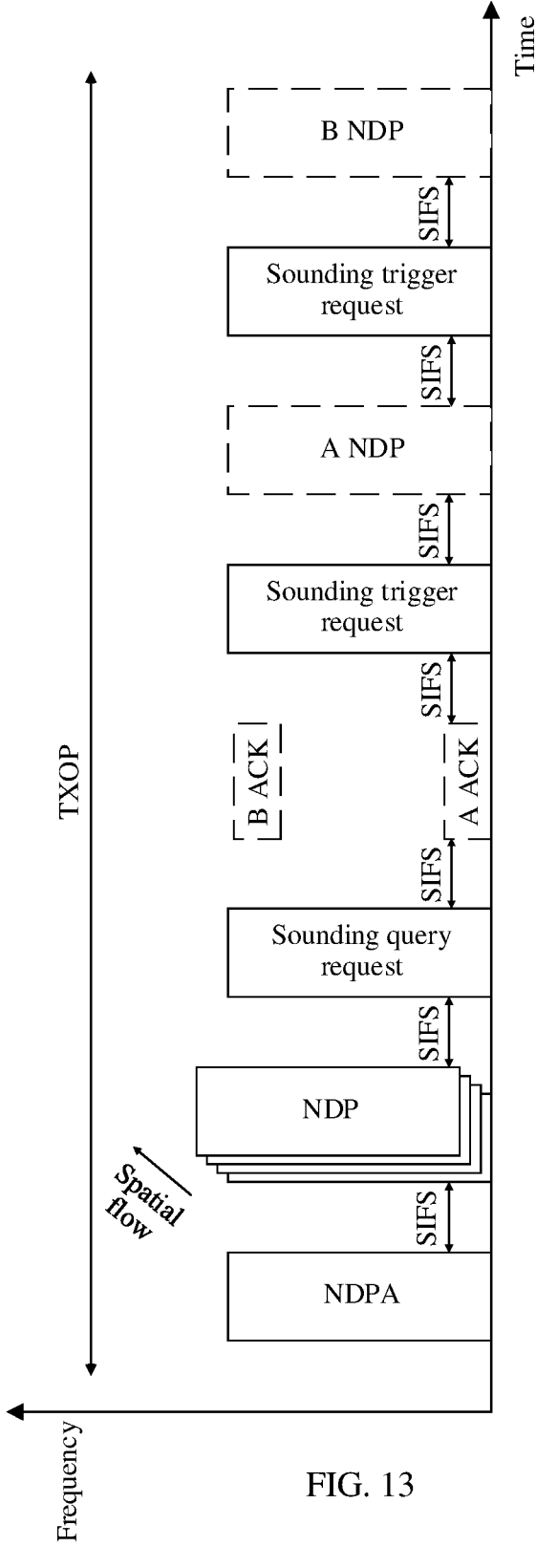
FIG. 13 is a schematic diagram of a process of a communication method according to an embodiment.
Figure 14:
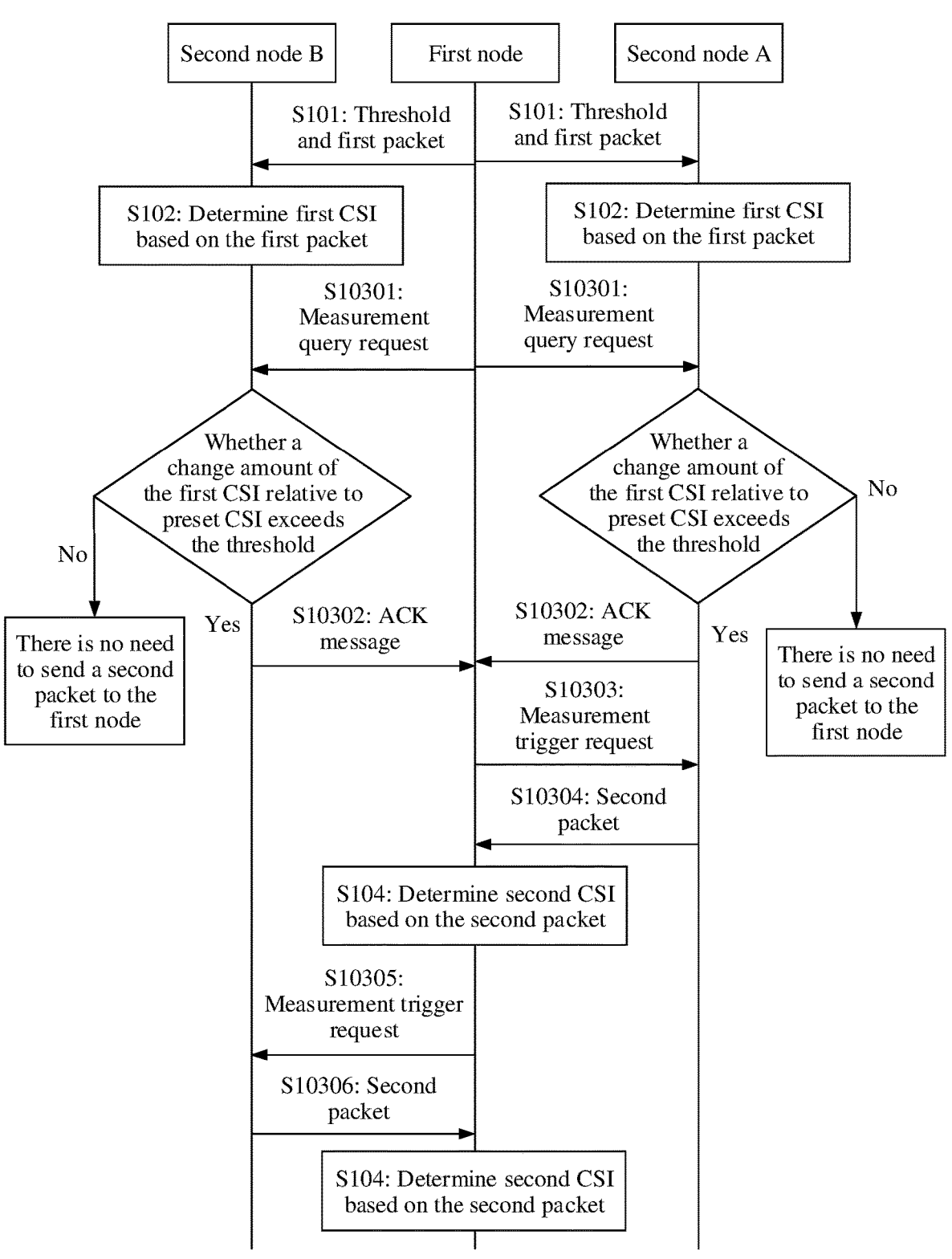
FIG. 14 is a schematic flowchart of another communication method according to an embodiment.

In the scenario shown in FIG. 13, there is one first node, there are two second nodes, and the two second nodes are respectively denoted as a second node A and a second node B. Both of the two second nodes feed back second packets to the first node. In other words, both the second node A and the second node B are third nodes. In one TXOP obtained by the first node, the first node first sends an NDPA to the second node in a broadcast manner, and then sends an NDP to the second node through different spatial flows, as shown by a solid-line block in FIG. 13. Herein, a short interframe space (SIFS) indicates a time interval at which the first node or the second node sends different packets. For example, a time interval between sending the NDPA by the first node and sending the NDP by the first node is one SIFS. A time interval between sending the NDP by the first node and sending a query frame (carrying the sounding query request) by the first node is one SIFS, as shown in FIG. 13 or FIG. 14. An implementation process of S103 includes the following steps.

S10301: The first node separately sends a measurement query request to the second node A and the second node B. Correspondingly, the second node A receives the measurement query request from the first node, and the second node B receives the measurement query request from the first node.

For example, the measurement query request may be a message in the IEEE 802.11az protocol, for example, a sounding poll message carried in a trigger frame (TF), or another similar message.

S10302: In response to the measurement query request, if the second node A determines that the change amount of the first CSI relative to the preset CSI exceeds the threshold, the second node A sends an acknowledgment ACK message to the first node. Correspondingly, the first node receives the ACK message from the second node A.

In response to the measurement query request, if the second node B determines that the change amount of the first CSI relative to the preset CSI exceeds the threshold, the second node B sends an acknowledgment ACK message to the first node. Correspondingly, the first node receives the ACK message from the second node B.

The ACK message indicates that the second packet is to be fed back to the first node.

For example, the ACK message may be a clear to send-to-self (CTS-to-Self) message or another control message.

For example, the second node A and the second node B feed back ACK messages to the first node in a frequency division multiplexing or spatial multiplexing manner. FIG. 13 shows that the second node A and the second node B feed back the ACK messages to the first node in the frequency division multiplexing manner. A dashed-line box identified by "A ACK" indicates the ACK message fed back by the second node A to the first node. A dashed-line box identified by "B ACK" indicates the ACK message fed back by the second node B to the first node.

S10303: The first node sends a measurement trigger request to the second node A. Correspondingly, the second node A receives the measurement trigger request from the first node.

The measurement trigger request includes an identifier of the second node A and encoding information of the second packet.

As shown in FIG. 13, in one TXOP obtained by the first node, the first node may send the measurement trigger request to the second node A.

S10304: In response to the measurement trigger request, the second node A sends the second packet to the first node. Correspondingly, the first node receives the second packet from the second node A.

For example, in one TXOP obtained by the first node, the second node A sends an NDP to the first node, as shown by a dashed-line box identified by "A NDP" in FIG. 13.

S10305: The first node sends a measurement trigger request to the second node B. Correspondingly, the second node B receives the measurement trigger request from the first node.

As shown in FIG. 13, in one TXOP obtained by the first node, the first node may send the measurement trigger request to the second node B.

S10306: In response to the measurement trigger request, the second node B sends the second packet to the first node. Correspondingly, the first node receives the second packet from the second node B.

For example, in one TXOP obtained by the first node, the second node B sends an NDP to the first node, as shown by a dashed-line box identified by "B NDP" in FIG. 13.

In this way, in a scenario in which one first node communicates with a plurality of second nodes, in one TXOP obtained by the first node, the first node can also sequentially receive second packets fed back by the plurality of second nodes, to determine states of radio channels between second nodes and obtain corresponding second CSI.

In the scenario in which one first node communicates with a plurality of second nodes, to further shorten time for obtaining a plurality of packets by the first node, the first node may trigger the plurality of second nodes at a time, so that the plurality of second nodes separately feed back the second packets to the first node in a spatial multiplexing manner or a frequency division multiplexing manner. The spatial multiplexing manner and the frequency division multiplexing manner are described in the following in detail.

Figure 15:
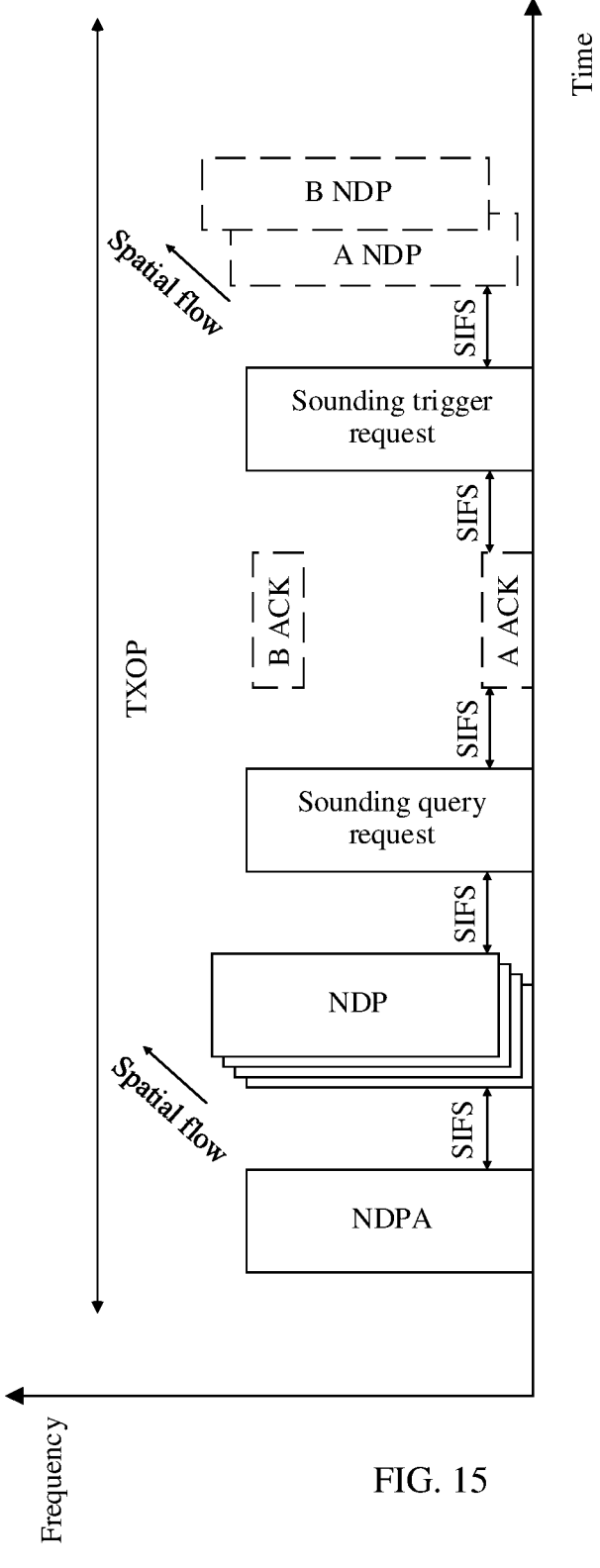
FIG. 15 is a schematic diagram of a process of another communication method according to an embodiment.
Figure 16:
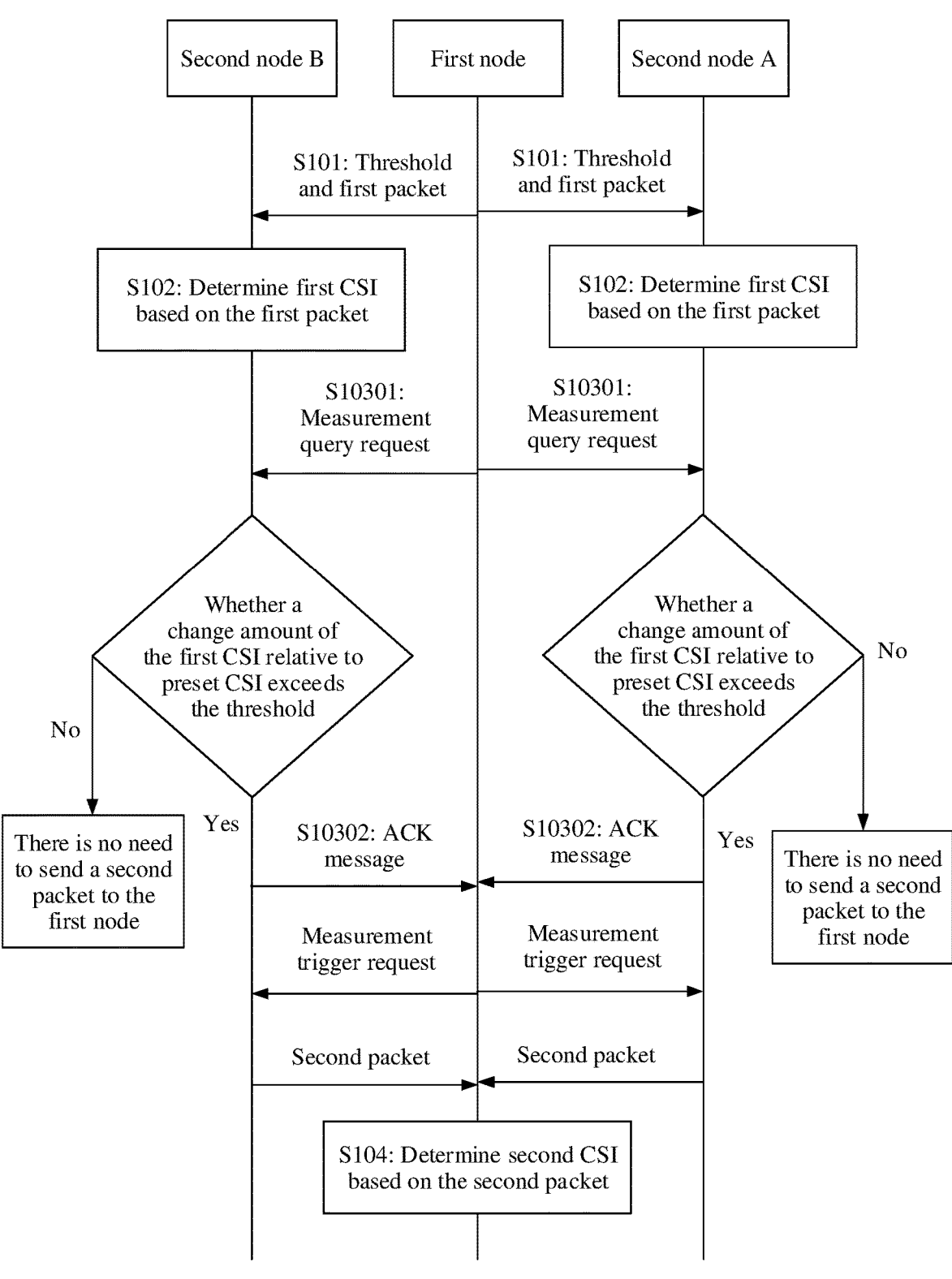
FIG. 16 is a schematic flowchart of still another communication method according to an embodiment.

First, an implementation process of using the spatial multiplexing manner is as follows:

As shown in FIG. 15, the first node may trigger a plurality of second nodes at a time, so that the plurality of second nodes separately feed back second packets by using different spatial flows. As shown in FIG. 16, after S10302, the communication method in this embodiment may further include the following steps.

Step 1: The first node separately sends a measurement trigger request to the second node A and the second node B. Correspondingly, the second node A receives the measurement trigger request from the first node. The second node B receives the measurement trigger request from the first node.

The measurement trigger request sent to the second node A further indicates, to the second node A, a spatial flow for transmitting the second packet. The measurement trigger request sent to the second node B further indicates, to the second node B, a spatial flow for transmitting the second packet.

Step 2: In response to the measurement trigger request, the second node A sends the second packet to the first node by using the spatial flow indicated by the measurement trigger request. Correspondingly, the first node receives the second packet from the second node A by using the spatial flow indicated by the measurement trigger request.

Step 3: In response to the measurement trigger request, the second node B sends the second packet to the first node by using the spatial flow indicated by the measurement trigger request. Correspondingly, the first node receives the second packet from the second node B by using the spatial flow indicated by the measurement trigger request.

It should be noted that when the second packet is transmitted to the first node in the spatial multiplexing manner, a number of second nodes that can be supported in the spatial multiplexing manner depends on a number of antennas of the first node. When there are a large number of second nodes, the first node sends the measurement trigger request twice or more times, so that the second node that is to feed back the second packet to the first node feeds back the second packet to the first node.

In this way, a plurality of second nodes feed back second packets to the first node in the spatial multiplexing manner, so that the first node simultaneously obtains a plurality of second packets by using different spatial flows. This shortens time for obtaining the second packets by the first node, and also helps improve efficiency of determining second CSI.

Second, an implementation process of using the frequency division multiplexing manner is as follows:

As shown in FIG. 16, after S10302, the communication method in this embodiment may further include the following steps.

Step 1: The first node separately sends a measurement trigger request to the second node A and the second node B. Correspondingly, the second node A receives the measurement trigger request from the first node. The second node B receives the measurement trigger request from the first node.

The measurement trigger request sent to the second node A further indicates, to the second node A, a subchannel for transmitting the second packet. The measurement trigger request sent to the second node B further indicates, to the second node B, a subchannel for transmitting the second packet.

Step 2: In response to the measurement trigger request, the second node A sends the second packet to the first node through the subchannel indicated by the measurement trigger request. Correspondingly, the first node receives the second packet from the second node A through the subchannel indicated by the measurement trigger request.

Step 2: In response to the measurement trigger request, the second node B sends the second packet to the first node through the subchannel indicated by the measurement trigger request. Correspondingly, the first node receives the second packet from the second node B through the subchannel indicated by the measurement trigger request.

In this way, a plurality of second nodes feed back second packets to the first node in the frequency division multiplexing manner, so that the first node simultaneously obtains a plurality of second packets through different subchannels. This shortens time for obtaining the second packets by the first node, and also helps improve efficiency of determining second CSI.

In a second possible implementation, because a radio sensing application is insensitive to message loss, even if a portion of information is lost within short time (for example, 100 milliseconds), a sounding effect of the radio sensing application is not affected. After the first node transmits the first packet to the second node, the TXOP obtained by the first node ends. In other words, the second node obtains a TXOP by itself, and feeds back the second packet to the first node by using the TXOP obtained by the second node.

Figure 17:
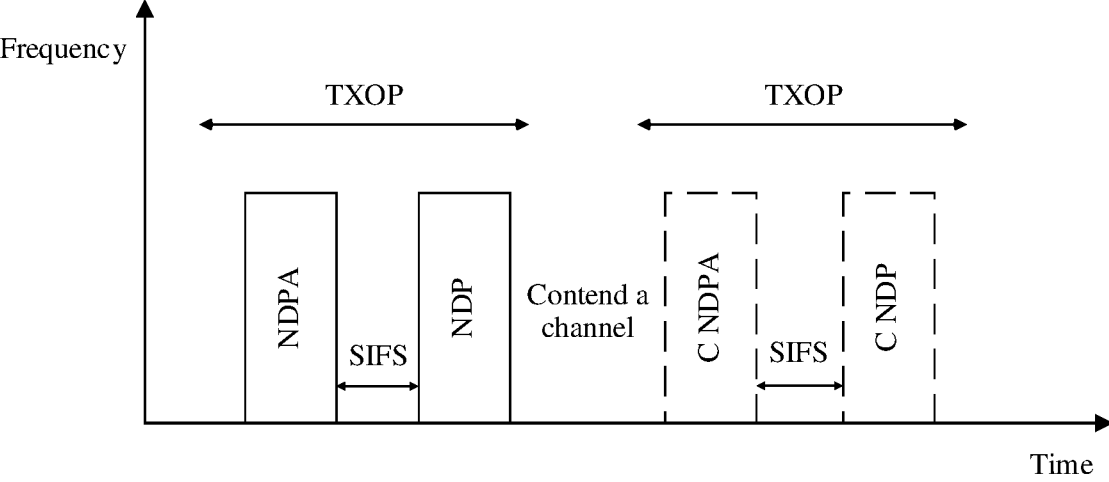
FIG. 17 is a schematic diagram of a process of still another communication method according to an embodiment.
Figure 18:
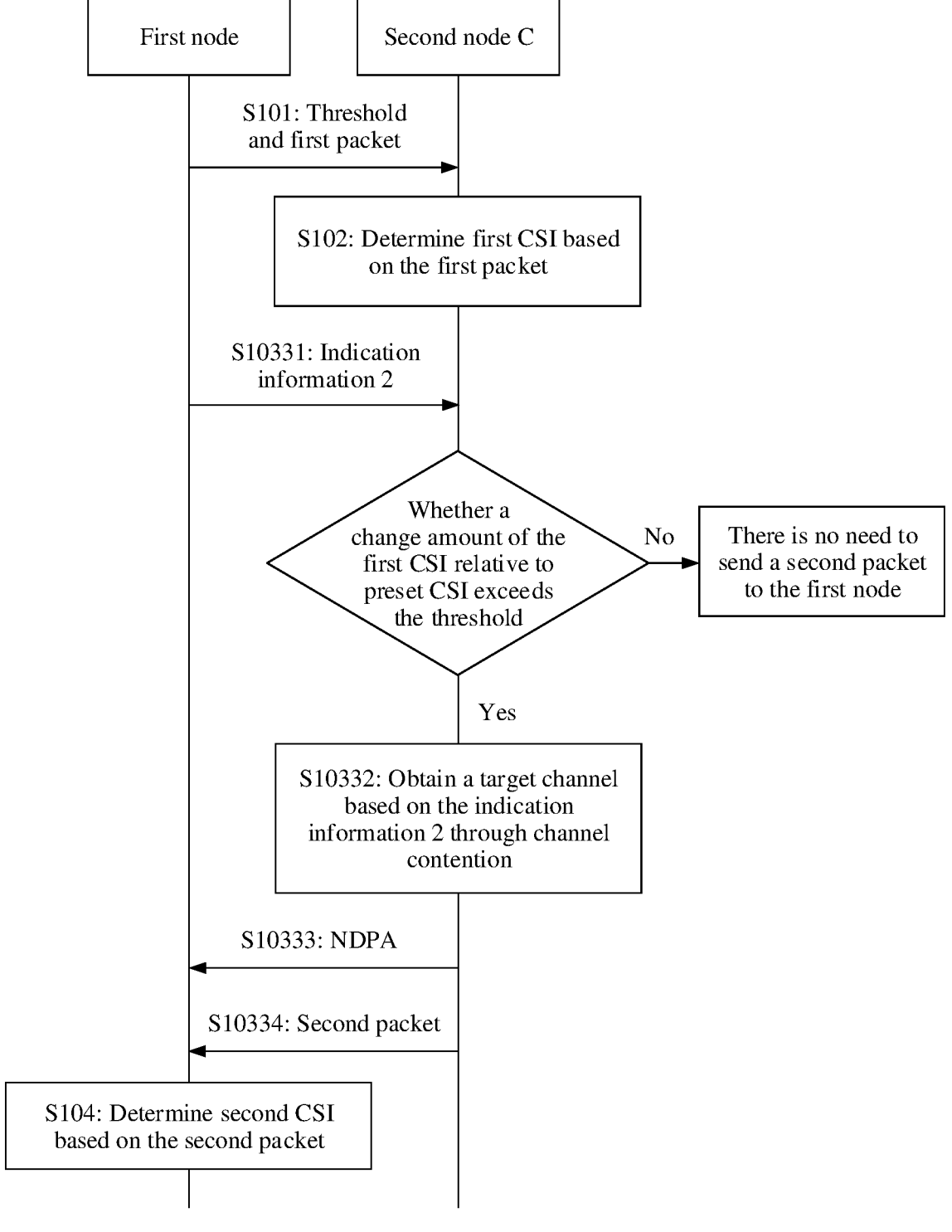
FIG. 18 is a schematic flowchart of yet another communication method according to an embodiment.

As shown in FIG. 17, one first node may communicate with one second node. The second node is denoted as a second node C. Because the second node C feeds back a second packet to the first node, the second node C is also a third node. A time interval at which the first node or the second node C sends different packets is also one SIFS. For example, a time interval between sending an NDPA by the first node and sending an NDP by the first node is one SIFS. A time interval between sending an NDPA by the second node C and sending an NDP by the second node C is one SIFS. In FIG. 17, a dashed-line box marked with "C NDPA" identifies the NDPA sent by the second node C. A dashed-line box marked with "C NDP" identifies the NDP sent by the second node C. As shown in FIG. 18, an implementation process of S103 may include the following steps.

S10331: The first node sends indication information 2 to the second node C. Correspondingly, the second node C receives the indication information 2 from the first node.

The indication information 2 indicates the second node C to obtain a TXOP and transmit a second packet to the first node by using the TXOP obtained by the second node C. In this embodiment, the indication information 2 may also be described as "first indication information".

A location for carrying the indication information 2 may be, for example, but is not limited to, the following example: A sounding dialog token field of an NDPA indicates that the NDPA is not used for ranging, and a value of an AID in a station information field is a preset value, for example, 2047, and the indication information 2 is carried in a reserved bit of the station information field of the NDPA.

S10332: If the change amount of the first CSI relative to the preset CSI exceeds the threshold, the second node C obtains a target channel based on the indication information 2 through channel contention.

For a practical process of channel contention, refer to related descriptions in the conventional technology. Details are not described herein again.

S10333: The second node C sends the NDPA to the first node through the target channel. Correspondingly, the first node receives the NDPA from the second node C through the target channel.

The NDPA indicates that the first node is to perform CSI measurement. After the second node C performs S10333, the second node C performs S10334.

S10334: The second node C sends the second packet to the first node through the target channel. Correspondingly, the first node receives the second packet from the second node C through the target channel.

After the first node sends an NDP to the second node C, a TXOP obtained by the first node may end. This shortens time for obtaining the TXOP by the first node. When the second node C needs to feed back the second packet, the second node C obtains one TXOP, to feed back the second packet to the first node. This manner is particularly applicable to a scenario in which an environment is quiet or a to-be-detected object has few actions. This can implement a radio sensing function, and save transmission resources.

Figure 19:
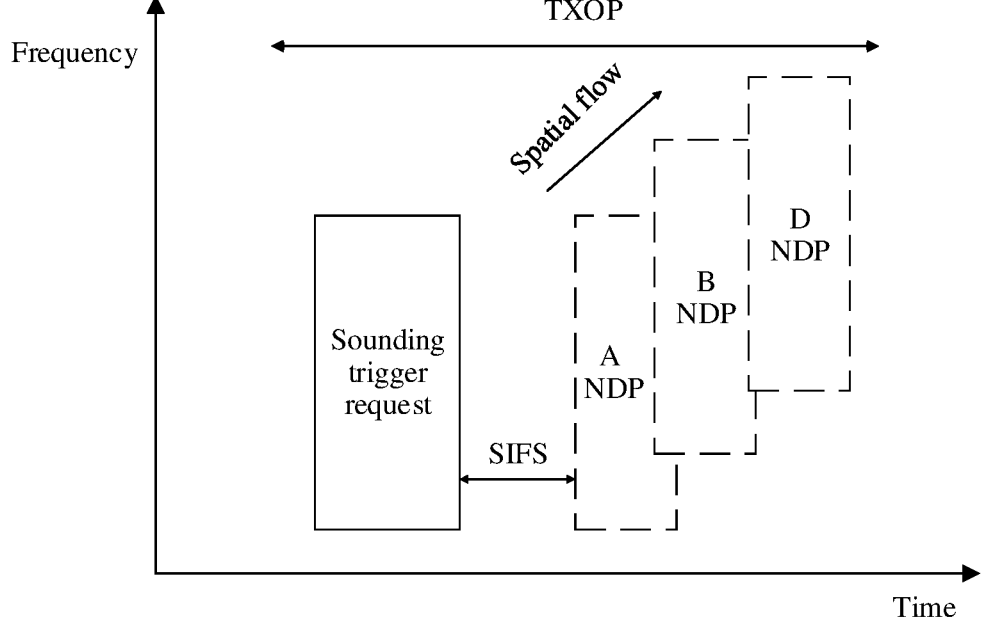
FIG. 19 is a schematic diagram of a process of yet another communication method according to an embodiment.

In some embodiments, in a scenario in which "one first node communicates with a plurality of second nodes", the first node further independently determines a second node that is to feed back a second packet. For example, the first node determines, from the plurality of second nodes according to a change rule of second CSI corresponding to second nodes, the second node that is to feed back the second packet, and/or the first node determines, from the plurality of second nodes based on ACK messages that are fed back, the second node that is to feed back the second packet. The scenario shown in FIG. 15 is used as an example. The first node determines, based on ACK messages that are fed back, that the second node A and the second node B are to feed back second packets. In addition, the first node determines, according to a change rule of second CSI, that a second node D in the second nodes is to feed back a second packet. In other words, the second node A, the second node B, and the second node D are fourth nodes. As shown in FIG. 19, the first node may separately send a sounding trigger request to the second node A, the second node B, and the second node D, as shown by solid-line blocks in FIG. 19. Correspondingly, the second node A, the second node B, and the second node D separately receive the sounding trigger request from the first node. In response to the sounding trigger request, the second node A sends the second packet to the first node. This is shown by a dashed-line block identified as "A NDP" in FIG. 19. In response to the sounding trigger request, the second node B sends the second packet to the first node. This is shown by a dashed-line block identified as "B NDP" in FIG. 19. In response to the sounding trigger request, the second node D sends the second packet to the first node. This is shown by a dashed-line block identified as "D NDP" in FIG. 19. The second node A, the second node B, and the second node D send second packets to the first node by using different spatial flows. In other words, in addition to determining, by the second node based on the threshold, whether to feed back the second packet to the first node, the first node can independently determine the second node that is to feed back the second packet, so that the first node can master environment states around different second nodes in real time. This helps improve radio sensing sensitivity.

In the foregoing, "the change amount of the first CSI relative to the preset CSI exceeds the threshold" is used as a determining basis, so that the second node determines whether to feed back the second packet to the first node. In the following, the "ranking range indicated by the threshold" is used as a determining basis, so that the second node determines whether to feed back the second packet to the first node. Herein, a scenario of "one first node and one second node" is still used as an example for description. In this scenario, each time the second node determines first CSI, the second node compares the first CSI determined at a current time with preset CSI, to obtain a change amount of the current first CSI relative to the preset CSI. In addition, the second node stores the CSI change amount obtained at the current time, and records and determines a time point corresponding to the current CSI change amount. The preset CSI may be default CSI of both the first node and the second node, for example, previous first CSI. A preset time period may be a time period set by the first node and the second node by default, for example, 15 minutes before the second node determines the first CSI as a reference time point.

Figure 20:
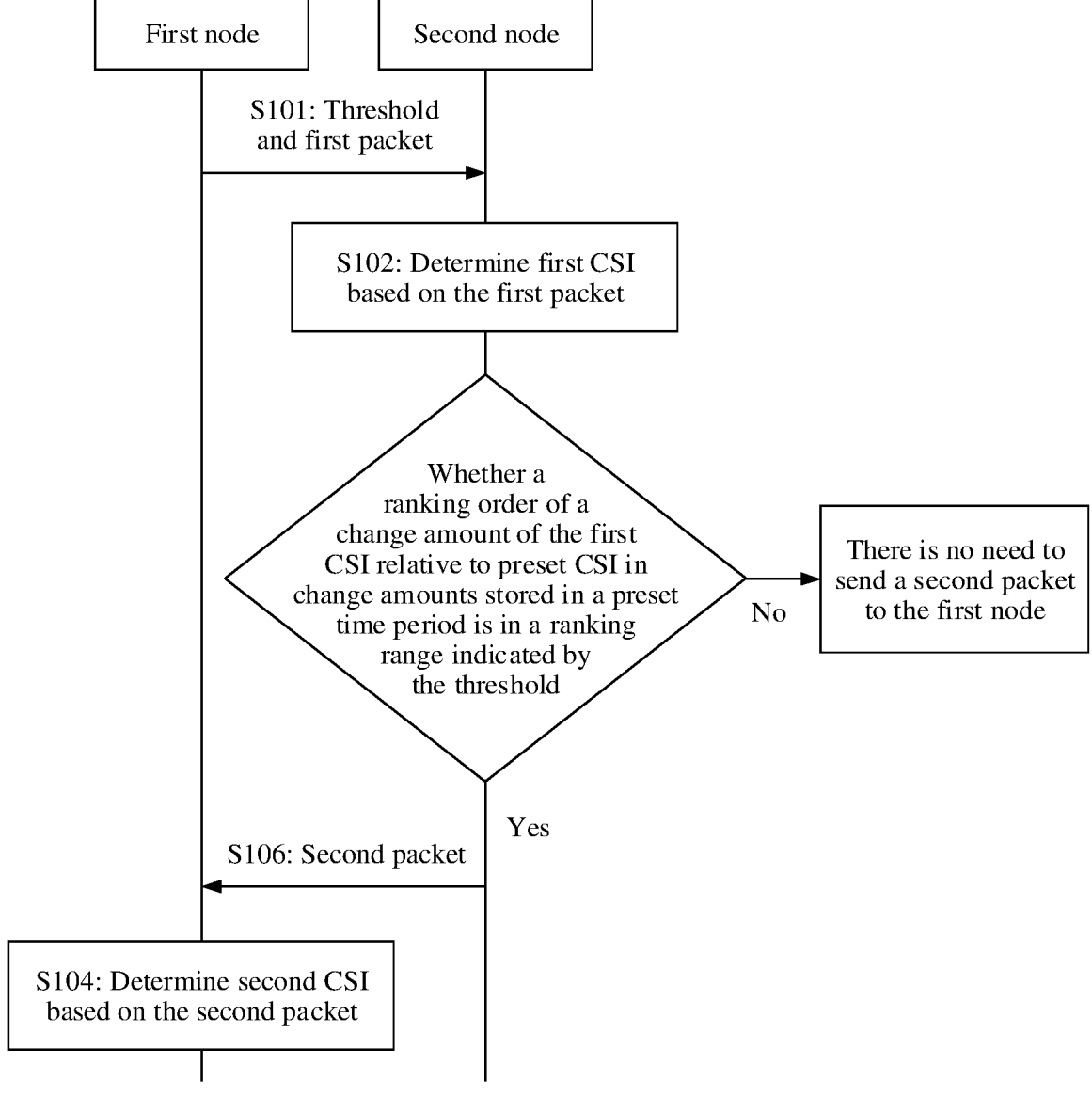
FIG. 20 is a schematic flowchart of still yet another communication method according to an embodiment.

As shown in FIG. 20, a communication method according to an embodiment may include the following steps.

S101: A first node sends a threshold and a first packet to a second node. Correspondingly, the second node receives the threshold and the first packet from the first node.

S102: The second node determines first CSI based on the first packet.

S106: If a ranking order of a change amount of the first CSI relative to preset CSI in CSI change amounts stored in a preset time period is in a ranking range indicated by the threshold, the second node sends a second packet to the first node. Correspondingly, the first node receives the second packet from the second node.

The CSI change amounts stored in the preset time period refer to: in CSI change amounts stored in the second node, CSI change amounts that are of moment points corresponding to the CSI change amounts and that are in the preset time period.

For example, after determining the change amount of the first CSI relative to the preset CSI, the second node sorts, based on values of CSI change amounts, the change amount of the first CSI relative to the preset CSI and the CSI change amounts stored in the preset time period. For example, sorting is performed in descending order. If the change amount of the first CSI relative to the preset CSI ranks top 5% in the ranking order, the second node sends the second packet to the first node. The threshold is "5%", and the ranking range indicated by the threshold is "top 5% in a descending ranking order of the change amount of the first CSI relative to the preset CSI and the CSI change amounts stored in the preset time period".

The threshold may be an amplitude threshold or a phase threshold. For details about the threshold, refer to related descriptions in S103. Details are not described herein again.

For related descriptions of the second packet, refer to related descriptions of S103. Details are not described herein again. S104: The first node determines second CSI based on the second packet.

According to the communication method provided in this embodiment, after the second node determines the first CSI, the second node determines, based on the ranking order of the change amount of the first CSI relative to the preset CSI in the CSI change amounts stored in the preset time period, and the ranking range indicated by the threshold, whether to feed back the second packet to the second node. In the conventional technology, after receiving the first packet from the first node, the second node feeds back CSI or a packet used to determine the CSI to the first node. However, in the communication method provided in this embodiment, if a to-be-detected object around the second node does not move or moves at a small amplitude, the ranking order of the change amount of the first CSI determined by the second node relative to the preset CSI in the CSI change amounts stored in the preset time period exceeds the ranking range indicated by the threshold, and the second node does not need to feed back the second packet to the first node, and does not need to occupy a channel. This saves transmission resources. If a to-be-detected object around the second node moves or moves at a large amplitude, the ranking order of the change amount of the first CSI determined by the second node relative to the preset CSI in the CSI change amounts stored in the preset time period is in the ranking range indicated by the threshold, and the second node feeds back the second packet to the first node. Because the second node feeds back the second packet instead of information of the CSI to the first node, transmission resources can be further saved.

In some embodiments, for a scenario in which "one first node communicates with a plurality of second nodes", S106 may be implemented in a plurality of manners, for example, but is not limited to the following two possible implementations.

Figure 21:
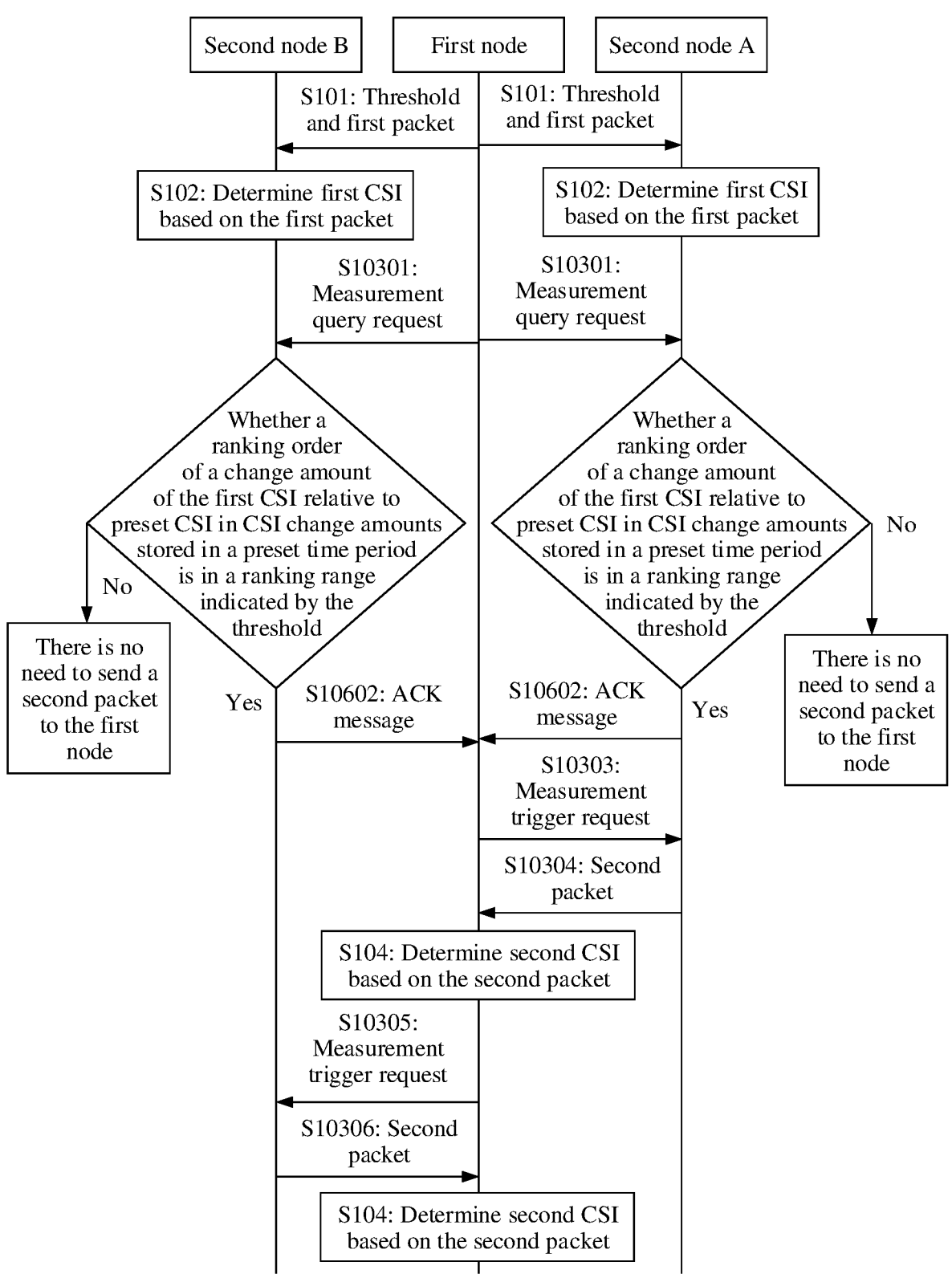
FIG. 21 is a schematic flowchart of a further communication method according to an embodiment.

In a first possible implementation, the first node actively queries whether the second node needs to feed back the second packet. When the second node determines to feed back the second packet, the second node sends the second packet to the first node. The scenario shown in FIG. 13 is still used as an example. As shown in FIG. 21, an implementation process of S106 may include the following steps.

S10301: The first node separately sends a measurement query request to the second node A and the second node B. Correspondingly, the second node A receives the measurement query request from the first node, and the second node B receives the measurement query request from the first node.

S10602: In response to the measurement query request, if the ranking order of the change amount of the first CSI relative to the preset CSI in the CSI change amounts stored in the preset time period is in the ranking range indicated by the threshold, the second node A sends an acknowledgment ACK message to the first node. Correspondingly, the first node receives the ACK message from the second node A.

In response to the measurement query request, if the ranking order of the change amount of the first CSI relative to the preset CSI in the CSI change amounts stored in the preset time period is in the ranking range indicated by the threshold, the second node B sends an acknowledgment ACK message to the first node. Correspondingly, the first node receives the ACK message from the second node B.

The ACK message indicates that the second packet is to be fed back to the first node. The second node A and the second node B may feed back ACK messages to the first node in a frequency division multiplexing or spatial multiplexing manner.

S10303: The first node sends a measurement trigger request to the second node A. Correspondingly, the second node A receives the measurement trigger request from the first node.

S10304: The second node A sends the second packet to the first node in response to the measurement trigger request. Correspondingly, the first node receives the second packet from the second node A.

S10305: The first node sends a measurement trigger request to the second node B. Correspondingly, the second node B receives the measurement trigger request from the first node.

S10306: The second node B sends the second packet to the first node in response to the measurement trigger request. Correspondingly, the first node receives the second packet from the second node B.

In this way, in a scenario in which one first node communicates with a plurality of second nodes, the second node determines, based on the ranking order of the change amount of the first CSI relative to the preset CSI in the CSI change amounts stored in the preset time period, and the ranking range indicated by the threshold, whether to feed back the second packet to the second node. In other words, in the preset time period, if the ranking order of the change amount of the first CSI relative to the preset CSI in the CSI change amounts stored in the preset time period is in the ranking range indicated by the threshold, it indicates that there is a moving to-be-detected object around the second node in the preset time period, or there is a to-be-detected object that moves at large amplitude around the second node. In this case, the second node sends the second packet to the first node, so that the first node can monitor an environment condition around the second node.

Figure 22:
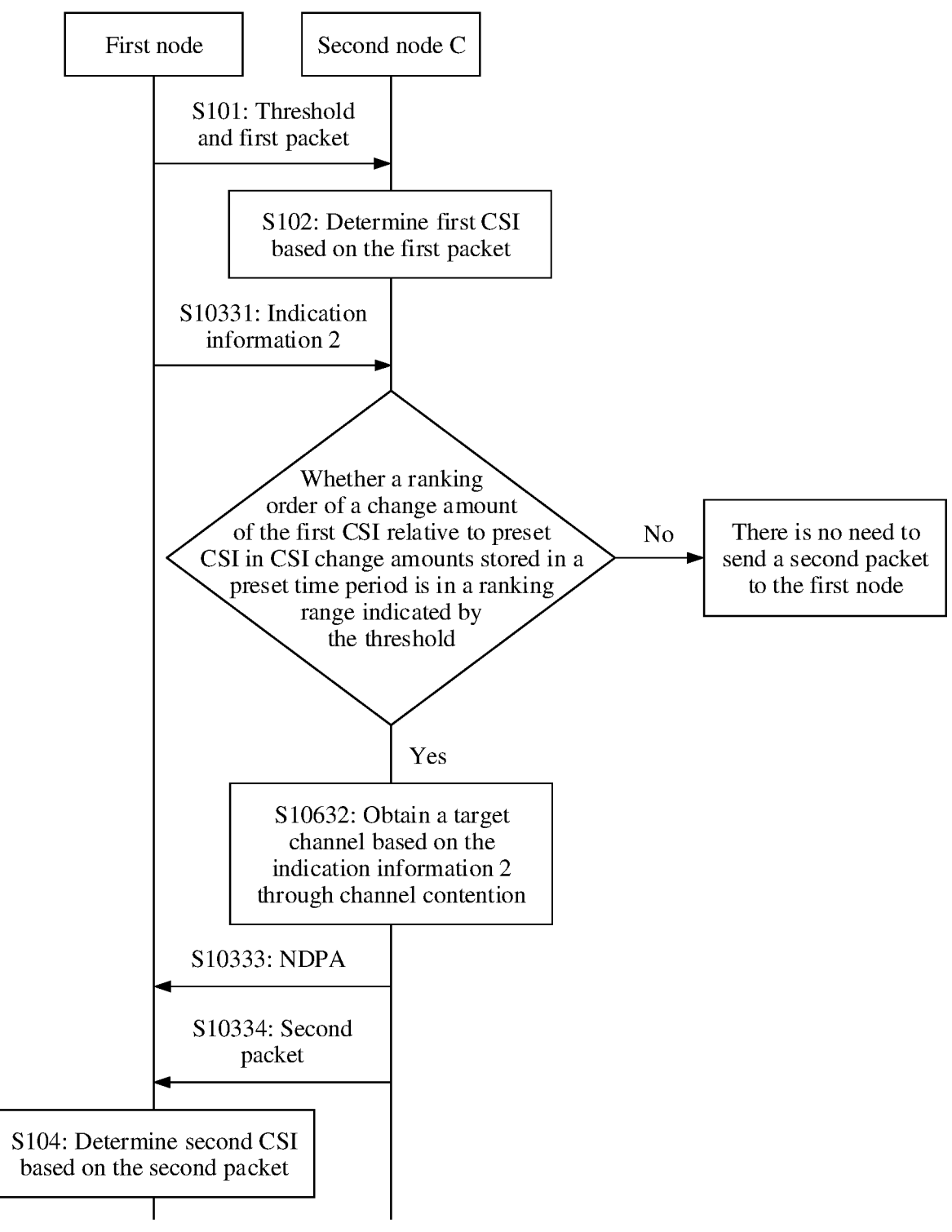
FIG. 22 is a schematic flowchart of a still further communication method according to an embodiment.

In a second possible implementation, after the first node transmits the first packet to the second node, a TXOP obtained by the first node ends. In other words, the second node obtains a TXOP by itself, and feeds back the second packet to the first node by using the TXOP obtained by the second node. The scenario shown in FIG. 17 is still used as an example. As shown in FIG. 22, an implementation process of S106 may include the following steps.

S10331: The first node sends indication information 2 to the second node C. Correspondingly, the second node C receives the indication information 2 from the first node.

S10632: If the ranking order of the change amount of the first CSI relative to the preset CSI in the CSI change amounts stored in the preset time period is in the ranking range indicated by the threshold, the second node C obtains a target channel based on the indication information 2 through channel contention.

S10333: The second node C sends an NDPA to the first node through the target channel Correspondingly, the first node receives the NDPA from the second node C through the target channel.

The NDPA indicates that the first node is to perform CSI measurement.

S10334: The second node C sends the second packet to the first node through the target channel Correspondingly, the first node receives the second packet from the second node C through the target channel.

After the first node sends an NDP to the second node C, a TXOP obtained by the first node may end. This shortens time for obtaining the TXOP by the first node. When the second node C needs to feed back the second packet, that is, in the preset time period, if the ranking order of the change amount of the first CSI relative to the preset CSI in the CSI change amounts stored in the preset time period is in the ranking range indicated by the threshold, it indicates there is a moving to-be-detected object around the second node in the preset time period, or there is a to-be-detected object that moves at large amplitude around the second node. In this case, the second node sends the second packet to the first node, so that the first node can monitor an environment condition around the second node.

Figure 23:
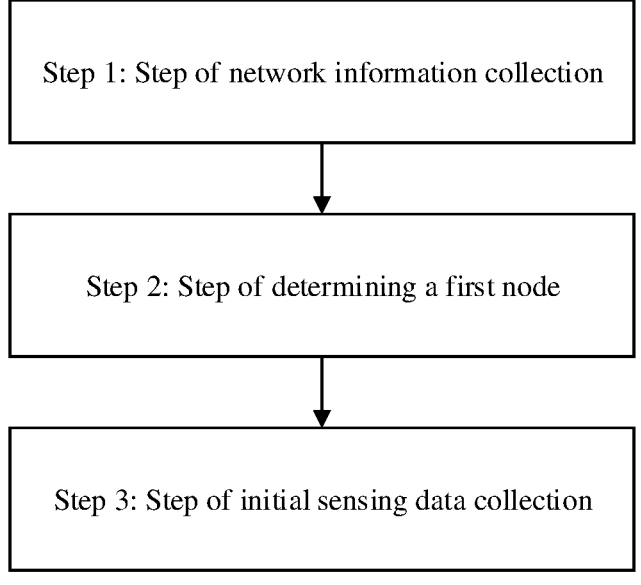
FIG. 23 is a schematic flowchart of a yet further communication method according to an embodiment.

The foregoing are all related descriptions of various implementations of the "radio sensing execution phase". Before the radio sensing execution phase, the communication method in this embodiment further includes a radio sensing preparation phase. In the radio sensing preparation phase, the first node and the second node are determined. As shown in FIG. 23, an implementation process of the radio sensing preparation phase may be as follows.

Step 1: Step of Network Information Collection

A radio node participating in sensing measures radio signal strength. In addition, the radio node participating in sensing determine location information, a node sensing capability, and a node identifier.

The node identifier may be a media access control (MAC) address, an AID, an SID, an RID, or the like.

Herein, for an implementation process of step 1, refer to an existing Wi-Fi processing process. Details are not described herein again.

Step 2: Step of Determining a First Node

The radio node participating in sensing determines, according to a preset selection rule, the first node from a plurality of radio nodes participating in sensing.

There may be one or more first nodes.

The preset selection rule may be, for example, but is not limited to, the following information: location information of a radio node, coverage of the radio node, a sensing capability of the radio node, a network interface condition of the radio node, a node type of the radio node, and the like.

Correspondingly, after the first node is determined, another radio node other than the first node in the radio nodes participating in sensing is a second node.

Step 3: Step of Initial Sensing Data Collection

The first node separately sends a measurement query request to a plurality of second nodes, and correspondingly, the plurality of second nodes separately receive the measurement query request from the first node. The measurement query request includes a dialog identifier. Second nodes in the plurality of second nodes feed back ACK messages to the first node in response to the measurement query request, so as to indicate to participate in a radio sensing sounding process.

In this way, in the radio sensing preparation phase, the radio node participating in sensing are first determined, and then the first node and the second node are determined in a plurality of radio nodes. In addition, the step of initial sensing data collection is performed, so that the first node and the second node participating in radio sensing have a same dialog identifier, and normal communication between the first node and the second node is ensured, so that the radio sensing execution phase can be efficiently executed.

The foregoing mainly describes the embodiments from a perspective of interaction between nodes. Correspondingly, an embodiment may further provide a communication apparatus. The communication apparatus may be the node in the foregoing method embodiment, or an apparatus including the foregoing node, or a component that can be used for the node. It may be understood that, to implement the foregoing functions, the communication apparatus includes a corresponding hardware structure and/or software module for performing the functions. A person skilled in the art should be easily aware that, with reference to units and algorithm steps in the examples described in the embodiments can be implemented in a form of hardware or a combination of hardware and computer software. Whether a function is performed by hardware or hardware driven by computer software depends on particular applications and constraints of the solutions. A person skilled in the art may use different methods to implement the described functions for each particular application, but it should not be considered that the implementation goes beyond the scope.

Figure 24:
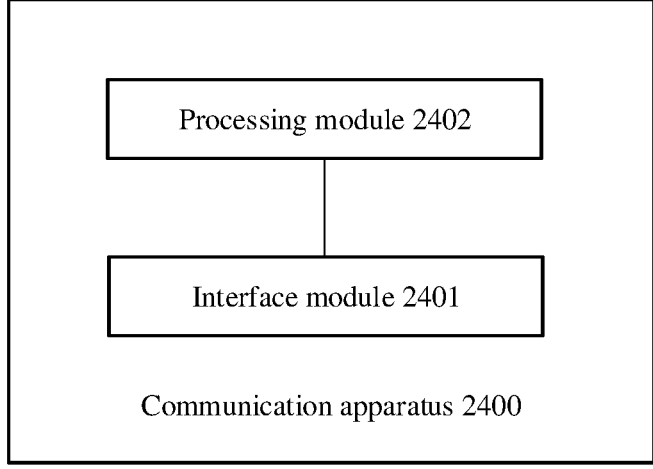
FIG. 24 is a schematic composition diagram of a communication apparatus according to an embodiment.

FIG. 24 shows a schematic diagram of a structure of a communication apparatus 2400. The communication apparatus 2400 includes an interface module 2401 and a processing module 2402. The interface module 2401 is an interface circuit of the apparatus and is configured to receive a signal from or send a signal to another apparatus. For example, when the apparatus is implemented in a form of a chip, the interface module 2401 is an interface circuit that is of the chip and that is configured to receive a signal from another chip or apparatus. Alternatively, the interface module 2401 is an interface circuit that is of the chip and that is configured to send a signal to another chip or apparatus.

For example, the communication apparatus 2400 is the second node in the foregoing method embodiment.

The interface module 2401 is configured to receive a threshold and a first packet from a first node. The processing module 2402 is configured to determine first channel state information CSI based on the first packet. The interface module 2401 is further configured to send a second packet to the first node if the processing module 2402 determines that a change amount of the first CSI relative to preset CSI exceeds the threshold.

The interface module 2401 may be further configured to receive a measurement query request from the first node. The processing module 2402 is further configured to determine, in response to the measurement query request, that the change amount of the first CSI relative to the preset CSI exceeds the threshold. The interface module 2401 is further configured to: if the processing module 2402 determines that the change amount of the first CSI relative to the preset CSI exceeds the threshold, send an acknowledgment ACK message to the first node, where the ACK message indicates that the second packet is to be fed back to the first node. The interface module 2401 is further configured to send the second packet to the first node after receiving a measurement trigger request from the first node.

The interface module 2401 may be configured to send the second packet to the first node by using a spatial flow indicated by the measurement trigger request.

The interface module 2401 may be configured to send the second packet to the first node through a subchannel indicated by the measurement trigger request.

The interface module 2401 may be further configured to receive first indication information from the first node. The processing module 2402 is further configured to determine that the change amount of the first CSI relative to the preset CSI exceeds the threshold. The processing module 2402 is further configured to obtain a target channel based on the first indication information through channel contention. The interface module 2401 is further configured to: after sending an NDPA to the first node through the target channel, send the second packet to the first node through the target channel, where the NDPA indicates that the first node is to perform CSI measurement.

For example, the communication apparatus 2400 is the terminal apparatus in the foregoing method embodiment.

The interface module 2401 is configured to receive a threshold and a first packet from a first node. The processing module 2402 is configured to determine first channel state information CSI based on the first packet. The interface module 2401 is configured to: if the processing module 2402 determines that a ranking order of a change amount of the first CSI relative to preset CSI in CSI change amounts stored in a preset time period is in a ranking range indicated by the threshold, send a second packet to the first node.

The interface module 2401 may be further configured to receive a measurement query request from the first node. The processing module 2402 is further configured to: in response to the measurement query request, determine that the ranking order of the change amount of the first CSI relative to the preset CSI in the CSI change amounts stored in the preset time period is in the ranking range indicated by the threshold. The interface module 2401 is further configured to send an acknowledgment ACK message to the first node. The ACK message indicates that the second packet is to be fed back to the first node.

The interface module 2401 may be further configured to receive first indication information from the first node. The processing module 2402 is further configured to determine that the ranking order of the change amount of the first CSI relative to the preset CSI in the CSI change amounts stored in the preset time period is in the ranking range indicated by the threshold. The processing module 2402 is further configured to obtain a target channel based on the first indication information through channel contention. The interface module 2401 is further configured to: after sending an NDPA to the first node through the target channel, send the second packet to the first node through the target channel The NDPA indicates that the first node is to perform CSI measurement.

For example, the communication apparatus 2400 is the first node in the foregoing method embodiment.

The interface module 2401 is configured to send a threshold and a first packet to a second node. The threshold and the first packet are used to determine a third node. The third node belongs to the second node. The interface module 2401 is further configured to receive a second packet from the third node. The processing module 2402 is configured to determine second CSI based on the second packet.

The interface module 2401 may be further configured to send a measurement query request to the second node. The interface module 2401 is further configured to receive an ACK message from the third node. The ACK message indicates that the second packet is to be fed back to the first node. The interface module 2401 is further configured to receive the second packet from the third node after sending a measurement trigger request to the third node.

The interface module 2401 may be configured to receive the second packet from the third node by using a spatial flow indicated by the measurement trigger request.

The interface module 2401 may be configured to receive the second packet from the third node through a subchannel indicated by the measurement trigger request.

The processing module 2402 may be further configured to determine a fourth node based on historical CSI of the second node and/or the ACK message of the third node. The interface module 2401 is further configured to receive the second packet from the fourth node after sending the measurement trigger request to the fourth node.

The interface module 2401 may be further configured to send first indication information to the second node. The interface module 2401 is further configured to: after receiving an NDPA from the third node through a target channel, receive the second packet from the third node through the target channel The NDPA indicates that the first node is to perform CSI measurement.

The interface module 2401 may be further configured to send second indication information to the second node, where the second indication information indicates that the first CSI determined based on the first packet is used for radio sensing.

All related content of the steps in the method embodiments may be cited in function descriptions of corresponding function modules. Details are not described herein again.

In this embodiment, the communication apparatus 2400 is presented in a form of functional modules obtained through division in an integrated manner. The "module" herein may be an ASIC, a circuit, a processor executing one or more software or firmware programs, a memory, an integrated logic circuit, and/or another component that can provide the foregoing functions. In a simple embodiment, a person skilled in the art may figure out that the communication apparatus 2400 may be in a form of a communication apparatus 2500 shown in FIG. 25.

Figure 25:
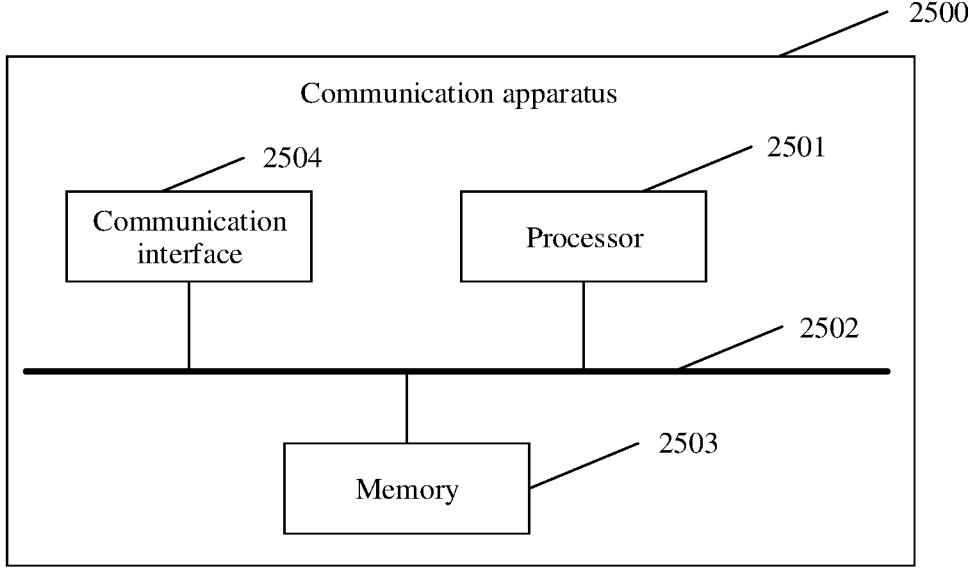
FIG. 25 is a schematic diagram of a hardware structure of a communication apparatus according to an embodiment.

For example, a processor 2501 in the communication apparatus 2500 shown in FIG. 25 may invoke computer-executable instructions stored in a memory 2503, so that the communication apparatus 2500 performs the communication method in the foregoing method embodiments.

Functions/implementation processes of the interface module 2401 and the processing module 2402 in FIG. 24 may be implemented by the processor 2501 in the communication apparatus 2500 shown in FIG. 25 by invoking the computer-executable instructions stored in the memory 2503. Alternatively, functions/implementation processes of the processing module 2402 in FIG. 24 may be implemented by the processor 2501 in the communication apparatus 2500 shown in FIG. 25 by invoking the computer-executable instructions stored in the memory 2503. Functions/implementation processes of the interface module 2401 in FIG. 24 may be implemented by using a communication interface 2504 in the communication apparatus 2500 shown in FIG. 25. The processor 2501, the memory 2503, and the communication interface 2504 are connected by using a bus 2502.

The communication apparatus 2400 provided in this embodiment may perform the foregoing communication method. Therefore, for effects that can be achieved by the communication apparatus, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions and is stored in a memory. A processor may be configured to execute the program instructions to implement the foregoing method procedures. The processor may be built in a system on a chip (SoC), an application-specific integrated circuit (ASIC), or may be an independent semiconductor chip. In addition to a core for executing software instructions to perform operations or processing, the processor may further include a necessary hardware accelerator, for example, a field programmable gate array (FPGA), a programmable logic device (PLD), or a logic circuit that implements a dedicated logic operation.

When the foregoing modules or units are implemented by using hardware, the hardware may be any one or any combination of a CPU, a microprocessor, a digital signal processing (DSP) chip, a microcontroller unit (MCU), an artificial intelligence processor, an ASIC, a system on chip (SoC), an FPGA, a PLD, a dedicated digital circuit, a hardware accelerator, or a non-integrated discrete device, and the hardware may run necessary software or does not depend on software, to perform the foregoing method procedures.

Optionally, an embodiment may further provide a communication apparatus (where for example, the communication apparatus may be a chip or a chip system). The communication apparatus includes a processor, configured to implement the method according to any one of the foregoing method embodiments. The communication apparatus may further include a memory. The memory is configured to store necessary program instructions and data. The processor may invoke program code stored in the memory, to instruct the communication apparatus to perform the method according to any one of the foregoing method embodiments. Certainly, the memory may alternatively not be in the communication apparatus. When the communication apparatus is a chip system, the communication apparatus may include a chip, or may include a chip and another discrete component. This is not limited in this embodiment.

All or a part of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to embodiments are completely or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center that integrates one or more usable media. The usable medium may be a magnetic medium (for example, a floppy disk, a hard disk drive, or a magnetic tape), an optical medium (for example, a digital video disc (DVD)), a semiconductor medium (for example, a solid-state disk (SSD)), or the like.

In the foregoing embodiments, "a plurality of" means two or more. The term "and/or" describes an association relationship between associated objects and indicates that three relationships may exist. For example, A and/or B may indicate the following three cases: Only A exists, both A and B exist, and only B exists. In addition, an element that appears in singular forms "a", "an", and "the" does not mean "one or only one" unless otherwise specified in the context but means "one or more". For example, "a device" means one or more such devices. Further, "at least one" means one or any combination of subsequent associated objects. For example, "at least one of A, B, and C" includes A, B, C, AB, AC, BC, or ABC. Determining Y based on X does not mean that Y is determined based on only X, and Y may be further determined based on X and other information.

Although described with reference to the embodiments, a person skilled in the art may understand and implement other variations of the disclosed embodiments by viewing the accompanying drawings, disclosed content, and appended claims. In the claims, the term "comprising" does not exclude another component or another step, and "a" or "one" does not exclude a case of plurality. A single processor or another unit may implement several functions listed in the claims. Some measures are recorded in dependent claims that are different from each other, but this does not mean that these measures cannot be combined to produce a better effect.

Although described with reference to the embodiments, various modifications and combinations may be made without departing from the spirit and scope. Correspondingly, this specification and the accompanying drawings are merely example descriptions defined by the appended claims, and are considered as any of or all modifications, variations, combinations, or equivalents that cover the scope. Clearly, a person skilled in the art can make various modifications and variations without departing from the spirit and scope. provided that they fall within the scope of the claims and equivalent technologies thereof.

What is claimed is:

1. A communication method, comprising performing radio sensing by steps of:

receiving, by a second node, a threshold and a first packet from a first node;

determining, by the second node, first channel state information (CSI) based on the first packet; and in response to a change amount of the first CSI relative to a preset CSI exceeding the threshold, sending, by the second node, a second packet to the first node, wherein the preset CSI is a CSI previous to the first CSI determined by the second node;

wherein sending, by the second node, the second packet to the first node in response to the change amount of the first CSI relative to the preset CSI exceeding the threshold further comprises:

receiving, by the second node, a measurement query request from the first node;

in response to both the measurement query request and the change amount of the first CSI relative to the preset CSI exceeding the threshold, sending, by the second node, an acknowledgment (ACK) message to the first mode, wherein the ACK message indicates that the second packet is to be fed back to the first node; and after the second mode receives a measurement trigger request from the first mode, sending, by the second node, the second packet to the first node.

2. The communication method according to claim 1, wherein the measurement trigger request further indicates a spatial flow for transmitting the second packet; and sending, by the second node, the second packet to the first node further comprises:

sending, by the second node, the second packet to the first node by using the spatial flow indicated by the measurement trigger request.

3. The communication method according to claim 1, wherein the measurement trigger request further indicates a subchannel for transmitting the second packet; and sending, by the second node, the second packet to the first node further comprises:

sending, by the second node, the second packet to the first node through the subchannel indicated by the measurement trigger request.

4. The communication method according to claim 1, wherein in response to the change amount of the first CSI relative to the preset CSI exceeding the threshold, sending, by the second node, the second packet to the first node further comprises:

receiving, by the second node, first indication information from the first node;

in response to the change amount of the first CSI relative to the preset CSI exceeding the threshold, obtaining, by the second node, a target channel based on the first indication information through channel contention; and after the second node sends a null data packet announcement (NDPA) to the first node through the target channel, sending, by the second node, the second packet to the first node through the target channel, wherein the NDPA indicates that the first node is to perform CSI measurement.

5. The communication method according to claim 1, wherein the threshold is carried in the NDPA or a query frame.

6. The communication method according to claim 5, wherein the threshold is carried in some bits other than an associate identifier (AID) in a station information field of the NDPA, and a value of the AID in the station information field is an identifier of the second node; and when a sounding dialog token field of the NDPA indicates that the NDPA is used for ranging, the threshold is carried in a user information field of the query frame.

7. The communication method according to claim 1, wherein the first packet is a null data packet (NDP), a physical layer protocol data unit (PPDU), or a data packet that carries a training symbol; and the second packet is an NDP, a PPDU, or a data packet that carries a training symbol.

8. A communication apparatus, comprising:

at least one processor; and at least one memory storing a program, wherein execution of the program by the at least one processor, causes the communication apparatus to perform radio sensing by performing steps of:

receive a threshold and a first packet from a first node; and determine first channel state information (CSI) based on the first packet; and in response to a change amount of the first CSI relative to a preset CSI exceeding the threshold, send a second packet to the first node, wherein the preset CSI is a CSI previous to the first CSI determined by the communication apparatus;

wherein the communication apparatus is configured to send the second packet to the first node by performing steps of:

receive a measurement query request from the first node;

in response to both the measurement query request and the change amount of the first CSI relative to the preset CSI exceeding the threshold, send an acknowledgment (ACK) message to the first node, wherein the ACK message indicates that the second packet is to be fed back to the first node;

receive a measurement trigger request from the first node; and after receiving the measurement trigger request from the first node, send the second packet to the first node.

9. The communication apparatus according to claim 8, wherein the measurement trigger request further indicates a spatial flow for transmitting the second packet and execution of the program by the at least one processor further causes the apparatus to:

send the second packet to the first node by using the spatial flow indicated by the measurement trigger request.

10. The communication apparatus according to claim 8, wherein the measurement trigger request further indicates a subchannel for transmitting the second packet and execution of the program by the at least one processor further causes the apparatus to:

send the second packet to the first node through the subchannel indicated by the measurement trigger request.

11. The communication apparatus according to claim 8, wherein execution of the program by the at least one processor further causes the apparatus to:

receive first indication information from the first node;

in response to the change amount of the first CSI relative to the preset CSI exceeding the threshold, obtain a target channel based on the first indication information through channel contention; and after sending a null data packet announcement (NDPA) to the first node through the target channel, send the second packet to the first node through the target channel, wherein the NDPA indicates that the first node is to perform CSI measurement.

12. The communication apparatus according to claim 8, wherein the threshold is carried in the NDPA or in a query frame.

13. The communication apparatus according to claim 12, wherein the threshold is carried in some bits other than an associate identifier (AID) in a station information field of the NDPA, and a value of the AID in the station information field is an identifier of the communication apparatus; and when the sounding dialog password field of the NDPA indicates that the NDPA is used for ranging, the threshold is carried in a user information field of the query frame.

14. The communication apparatus according to claim 8, wherein the first packet is a null data packet (NDP), a physical layer protocol data unit (PPDU), or a data packet that carries a training symbol; and the second packet is an NDP, a PPDU, or a data packet that carries a training symbol.

15. A non-transitory computer-readable storage medium, wherein the non-transitory computer-readable storage medium stores a program, and invocation of the program by a processor causes the processor to perform radio sensing by performing steps of:

receive a threshold and a first packet from a first node; and determine first channel state information (CSI) based on the first packet; and in response to a change amount of the first CSI relative to a preset CSI exceeding the threshold, send a second packet to the first node, wherein the preset CSI is a CSI previous to the first CSI determined by the processor;

wherein the processor is caused to send the second packet to the first node by performing steps of:

receive a measurement query request from the first node;

in response to both the measurement query request and the change amount of the first CSI relative to the preset CSI exceeding the threshold, send an acknowledgment (ACK) message to the first node, wherein the ACK message indicates that the second packet is to be fed back to the first node;

receive a measurement trigger request from the first node; and after receiving the measurement trigger request from the first node, send the second packet to the first node.

16. The non-transitory computer-readable storage medium according to claim 15, wherein the measurement trigger request further indicates a spatial flow for transmitting the second packet and invocation of the program by the processor further causes the processor to:

send the second packet to the first node by using the spatial flow indicated by the measurement trigger request.

17. The non-transitory computer-readable storage medium according to claim 15, wherein the measurement trigger request further indicates a subchannel for transmitting the second packet and invocation of the program by the processor further causes the processor to: send the second packet to the first node through the subchannel indicated by the measurement trigger request.

* * * * *